US011176302B2

United States Patent
Rao et al.

(10) Patent No.: US 11,176,302 B2
(45) Date of Patent: Nov. 16, 2021

(54) SYSTEM ON CHIP (SOC) BUILDER

(71) Applicant: NetSpeed Systems, Inc., San Jose, CA (US)

(72) Inventors: Nishant Rao, San Jose, CA (US); Sailesh Kumar, San Jose, CA (US); Pier Giorgio Raponi, San Jose, CA (US)

(73) Assignee: NETSPEED SYSTEMS, INC., San Jose, CA (US)

( * ) Notice: Subject to any disclaimer, the term of this patent is extended or adjusted under 35 U.S.C. 154(b) by 315 days.

(21) Appl. No.: 16/258,149

(22) Filed: Jan. 25, 2019

(65) Prior Publication Data

US 2019/0266307 A1    Aug. 29, 2019

Related U.S. Application Data

(60) Provisional application No. 62/634,653, filed on Feb. 23, 2018.

(51) Int. Cl.
*G06F 30/30* (2020.01)
*G06F 30/392* (2020.01)
(Continued)

(52) U.S. Cl.
CPC ............ *G06F 30/392* (2020.01); *G06F 30/30* (2020.01); *G06F 30/33* (2020.01); *H01L 23/3114* (2013.01)

(58) Field of Classification Search
CPC ........ G06F 30/392; G06F 30/30; G06F 30/33; H01L 23/3114
(Continued)

(56) References Cited

U.S. PATENT DOCUMENTS 4,409,838 A   10/1983   Schomberg
4,933,933 A    6/1990   Dally et al.
(Continued)

FOREIGN PATENT DOCUMENTS

CN    103684961 A    3/2014
JP      5936793      5/2016
(Continued)

OTHER PUBLICATIONS

Lu, "Design and Analysis of On-Chip Communication for Network-on-Chip Platforms", Royal Institute of Technology School of Information and Communication Technology Department of Electronic, Computer and Software Systems, Mar. 2007 (Year: 2007).*
(Continued)

*Primary Examiner* — Jack Chiang
*Assistant Examiner* — Brandon Bowers
(74) *Attorney, Agent, or Firm* — Spectrum IP Law Group LLC

(57) ABSTRACT

Methods and example implementations described herein are generally directed to a System on Chip (SoC) design and verification system and method that constructs SoC from functional building blocks circuits while concurrently taking into account numerous chip level design aspects along with the generation of a simulation environment for design verification. An aspect of the present disclosure relates to a method for generating a System on Chip (SoC) from a floor plan having one or more integration descriptions. The method includes the steps of generating one or more connections between the integration descriptions of the floor plan based at least on a traffic specification, and conducting a design check process on the floor plan. If the design check process on the floor plan is indicative of passing the design check process, then the method generates the SoC according
(Continued)

to the one or more connections generated between the integration descriptions.

20 Claims, 17 Drawing Sheets

(51) Int. Cl.
  *H01L 23/31* (2006.01)
  *G06F 30/33* (2020.01)
(58) Field of Classification Search
  USPC .......................................................... 716/118
  See application file for complete search history.

(56) References Cited

U.S. PATENT DOCUMENTS

| | | | |
|---|---|---|---|
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |
| 5,563,003 A | 10/1996 | Suzuki et al. |
| 5,583,990 A | 12/1996 | Birrittella et al. |
| 5,588,152 A | 12/1996 | Dapp et al. |
| 5,764,740 A | 6/1998 | Holender |
| 5,790,554 A | 8/1998 | Pitcher et al. |
| 5,859,981 A | 1/1999 | Levin et al. |
| 5,991,308 A | 11/1999 | Fuhrmann et al. |
| 5,999,530 A | 12/1999 | LeMaire et al. |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,377,543 B1 | 4/2002 | Grover et al. |
| 6,415,282 B1 | 7/2002 | Mukherjea et al. |
| 6,668,360 B1 * | 12/2003 | Liu .................. G06F 30/398 716/106 |
| 6,674,720 B1 | 1/2004 | Passint et al. |
| 6,701,361 B1 | 3/2004 | Meier |
| 6,711,717 B2 | 3/2004 | Nystrom et al. |
| 6,778,531 B1 | 8/2004 | Kodialam et al. |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,583,602 B2 | 9/2009 | Bejerano et al. |
| 7,590,959 B2 | 9/2009 | Tanaka |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,098,677 B1 | 1/2012 | Pleshek et al. |
| 8,099,757 B2 | 1/2012 | Riedle et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,503,445 B2 | 8/2013 | Lo |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,572,353 B1 | 10/2013 | Bratt et al. |
| 8,601,423 B1 | 12/2013 | Philip et al. |
| 8,614,955 B2 | 12/2013 | Gintis et al. |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 8,885,510 B2 | 11/2014 | Kumar et al. |
| 9,210,048 B1 | 12/2015 | Marr et al. |
| 9,223,711 B2 | 12/2015 | Philip et al. |
| 9,244,845 B2 | 1/2016 | Rowlands et al. |
| 9,244,880 B2 | 1/2016 | Philip et al. |
| 9,253,085 B2 | 2/2016 | Kumar et al. |
| 9,294,354 B2 | 3/2016 | Kumar |
| 9,319,232 B2 | 4/2016 | Kumar |
| 9,444,702 B1 | 9/2016 | Raponi et al. |
| 9,471,726 B2 | 10/2016 | Kumar et al. |
| 9,473,359 B2 | 10/2016 | Kumar et al. |
| 9,473,388 B2 | 10/2016 | Kumar et al. |
| 9,473,415 B2 | 10/2016 | Kumar |
| 9,477,280 B1 | 10/2016 | Gangwar et al. |
| 9,529,400 B1 | 12/2016 | Kumar et al. |
| 9,535,848 B2 | 1/2017 | Rowlands et al. |
| 9,568,970 B1 | 2/2017 | Kaushal et al. |
| 9,569,579 B1 | 2/2017 | Kumar |
| 9,571,341 B1 | 2/2017 | Kumar et al. |
| 9,571,402 B2 | 2/2017 | Kumar et al. |
| 9,571,420 B2 | 2/2017 | Kumar |
| 9,590,813 B1 | 3/2017 | Kumar et al. |
| 9,660,942 B2 | 5/2017 | Kumar |
| 9,674,079 B1 * | 6/2017 | Bellagamba ............ H04L 45/28 |
| 9,699,079 B2 | 7/2017 | Chopra et al. |
| 9,742,630 B2 | 8/2017 | Philip et al. |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2002/0150094 A1 | 10/2002 | Cheng et al. |
| 2003/0005149 A1 | 1/2003 | Haas et al. |
| 2003/0088602 A1 | 5/2003 | Dutta et al. |
| 2003/0145314 A1 | 7/2003 | Nguyen et al. |
| 2003/0200315 A1 | 10/2003 | Goldenberg et al. |
| 2004/0006584 A1 | 1/2004 | Vandeweerd |
| 2004/0019814 A1 | 1/2004 | Pappalardo et al. |
| 2004/0049565 A1 | 3/2004 | Keller et al. |
| 2004/0103218 A1 | 5/2004 | Blumrich et al. |
| 2004/0156376 A1 | 8/2004 | Nakagawa |
| 2004/0156383 A1 | 8/2004 | Nakagawa et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2005/0228930 A1 | 10/2005 | Ning et al. |
| 2005/0286543 A1 | 12/2005 | Coppola et al. |
| 2006/0002303 A1 | 1/2006 | Bejerano et al. |

(56) References Cited

U.S. PATENT DOCUMENTS

| | | |
|---|---|---|
| 2006/0031615 A1 | 2/2006 | Bruce et al. |
| 2006/0053312 A1 | 3/2006 | Jones et al. |
| 2006/0075169 A1 | 4/2006 | Harris et al. |
| 2006/0104274 A1 | 5/2006 | Caviglia et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0127014 A1 | 5/2008 | Pandey et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen et al. |
| 2009/0067348 A1 | 3/2009 | Vasseur et al. |
| 2009/0070726 A1 | 3/2009 | Mehrotra et al. |
| 2009/0083263 A1 | 3/2009 | Felch et al. |
| 2009/0089725 A1 | 4/2009 | Khan |
| 2009/0109996 A1 | 4/2009 | Hoover et al. |
| 2009/0122703 A1 | 5/2009 | Gangwal et al. |
| 2009/0125574 A1 | 5/2009 | Mejdrich et al. |
| 2009/0125703 A1 | 5/2009 | Mejdrich et al. |
| 2009/0125706 A1 | 5/2009 | Hoover et al. |
| 2009/0135739 A1 | 5/2009 | Hoover et al. |
| 2009/0138567 A1 | 5/2009 | Hoover et al. |
| 2009/0150647 A1 | 6/2009 | Mejdrich et al. |
| 2009/0157976 A1 | 6/2009 | Comparan et al. |
| 2009/0172304 A1 | 7/2009 | Gueron et al. |
| 2009/0182944 A1 | 7/2009 | Comparan et al. |
| 2009/0182954 A1 | 7/2009 | Mejdrich et al. |
| 2009/0182986 A1 | 7/2009 | Schwinn et al. |
| 2009/0182987 A1 | 7/2009 | Mejdrich et al. |
| 2009/0187716 A1 | 7/2009 | Comparan et al. |
| 2009/0187734 A1 | 7/2009 | Mejdrich et al. |
| 2009/0187756 A1 | 7/2009 | Nollet et al. |
| 2009/0201302 A1 | 8/2009 | Hoover et al. |
| 2009/0210184 A1 | 8/2009 | Medardoni et al. |
| 2009/0210883 A1 | 8/2009 | Hoover et al. |
| 2009/0228681 A1 | 9/2009 | Mejdrich et al. |
| 2009/0228682 A1 | 9/2009 | Mejdrich et al. |
| 2009/0228689 A1 | 9/2009 | Muff et al. |
| 2009/0228690 A1 | 9/2009 | Muff et al. |
| 2009/0231348 A1 | 9/2009 | Mejdrich et al. |
| 2009/0231349 A1 | 9/2009 | Mejdrich et al. |
| 2009/0240920 A1 | 9/2009 | Muff et al. |
| 2009/0245257 A1 | 10/2009 | Comparan et al. |
| 2009/0256836 A1 | 10/2009 | Fowler et al. |
| 2009/0260013 A1 | 10/2009 | Heil et al. |
| 2009/0268677 A1 | 10/2009 | Chou et al. |
| 2009/0271172 A1 | 10/2009 | Mejdrich et al. |
| 2009/0276572 A1 | 11/2009 | Heil et al. |
| 2009/0282139 A1 | 11/2009 | Mejdrich et al. |
| 2009/0282197 A1 | 11/2009 | Comparan et al. |
| 2009/0282211 A1 | 11/2009 | Hoover et al. |
| 2009/0282214 A1 | 11/2009 | Kuesel et al. |
| 2009/0282221 A1 | 11/2009 | Heil et al. |
| 2009/0282222 A1 | 11/2009 | Hoover et al. |
| 2009/0282226 A1 | 11/2009 | Hoover et al. |
| 2009/0282227 A1 | 11/2009 | Hoover et al. |
| 2009/0282419 A1 | 11/2009 | Mejdrich et al. |
| 2009/0285222 A1 | 11/2009 | Hoover et al. |
| 2009/0287885 A1 | 11/2009 | Kriegel et al. |
| 2009/0292907 A1 | 11/2009 | Schwinn et al. |
| 2009/0293061 A1 | 11/2009 | Schwinn et al. |
| 2009/0300292 A1 | 12/2009 | Fang et al. |
| 2009/0300335 A1 | 12/2009 | Muff et al. |
| 2009/0307714 A1 | 12/2009 | Hoover et al. |
| 2009/0313592 A1 | 12/2009 | Murali et al. |
| 2009/0315908 A1 | 12/2009 | Comparan et al. |
| 2010/0023568 A1 | 1/2010 | Hickey et al. |
| 2010/0031009 A1 | 2/2010 | Muff et al. |
| 2010/0040162 A1 | 2/2010 | Suehiro |
| 2010/0042812 A1 | 2/2010 | Hickey et al. |
| 2010/0042813 A1 | 2/2010 | Hickey et al. |
| 2010/0070714 A1 | 3/2010 | Hoover et al. |
| 2010/0091787 A1 | 4/2010 | Muff et al. |
| 2010/0100707 A1 | 4/2010 | Mejdrich et al. |
| 2010/0100712 A1 | 4/2010 | Mejdrich et al. |
| 2010/0100770 A1 | 4/2010 | Mejdrich et al. |
| 2010/0100934 A1 | 4/2010 | Mejdrich et al. |
| 2010/0106940 A1 | 4/2010 | Muff et al. |
| 2010/0125722 A1 | 5/2010 | Hickey et al. |
| 2010/0158005 A1 | 6/2010 | Mukhopadhyay et al. |
| 2010/0162019 A1 | 6/2010 | Kumar et al. |
| 2010/0189111 A1 | 7/2010 | Muff et al. |
| 2010/0191940 A1 | 7/2010 | Mejdrich et al. |
| 2010/0211718 A1 | 8/2010 | Gratz et al. |
| 2010/0223505 A1 | 9/2010 | Andreev et al. |
| 2010/0228781 A1 | 9/2010 | Fowler et al. |
| 2010/0239185 A1 | 9/2010 | Fowler et al. |
| 2010/0239186 A1 | 9/2010 | Fowler et al. |
| 2010/0242003 A1 | 9/2010 | Kwok |
| 2010/0269123 A1 | 10/2010 | Mejdrich et al. |
| 2010/0284309 A1 | 11/2010 | Allan et al. |
| 2010/0333099 A1 | 12/2010 | Kupferschmidt et al. |
| 2011/0022754 A1 | 1/2011 | Cidon et al. |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0063285 A1 | 3/2011 | Hoover et al. |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn et al. |
| 2011/0103799 A1 | 5/2011 | Shacham et al. |
| 2011/0119322 A1 | 5/2011 | Li et al. |
| 2011/0154282 A1 | 6/2011 | Chang et al. |
| 2011/0173258 A1 | 7/2011 | Arimilli et al. |
| 2011/0191088 A1 | 8/2011 | Hsu et al. |
| 2011/0191774 A1 | 8/2011 | Hsu et al. |
| 2011/0235531 A1 | 9/2011 | Vangal et al. |
| 2011/0243147 A1 | 10/2011 | Paul |
| 2011/0276937 A1 | 11/2011 | Waller |
| 2011/0289485 A1 | 11/2011 | Mejdrich et al. |
| 2011/0292063 A1 | 12/2011 | Mejdrich et al. |
| 2011/0302345 A1 | 12/2011 | Boucard et al. |
| 2011/0302450 A1 | 12/2011 | Hickey et al. |
| 2011/0307734 A1 | 12/2011 | Boesen et al. |
| 2011/0316864 A1 | 12/2011 | Mejdrich et al. |
| 2011/0320719 A1 | 12/2011 | Mejdrich et al. |
| 2011/0320724 A1 | 12/2011 | Mejdrich et al. |
| 2011/0320771 A1 | 12/2011 | Mejdrich et al. |
| 2011/0320854 A1 | 12/2011 | Elrabaa |
| 2011/0320991 A1 | 12/2011 | Hsu et al. |
| 2011/0321057 A1 | 12/2011 | Mejdrich et al. |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0054511 A1 | 3/2012 | Brinks et al. |
| 2012/0072635 A1 | 3/2012 | Koshida et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker et al. |
| 2012/0155250 A1 | 6/2012 | Carney et al. |
| 2012/0173846 A1 | 7/2012 | Wang et al. |
| 2012/0176364 A1 | 7/2012 | Schardt et al. |
| 2012/0195321 A1 | 8/2012 | Ramanujam et al. |

(56) References Cited

U.S. PATENT DOCUMENTS

| | | |
|---|---|---|
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0221711 A1 | 8/2012 | Kuesel et al. |
| 2012/0260252 A1 | 10/2012 | Kuesel et al. |
| 2012/0311512 A1 | 12/2012 | Michel et al. |
| 2013/0021896 A1 | 1/2013 | Pu et al. |
| 2013/0028083 A1 | 1/2013 | Yoshida et al. |
| 2013/0028090 A1 | 1/2013 | Yamaguchi et al. |
| 2013/0028261 A1 | 1/2013 | Lee |
| 2013/0036296 A1 | 2/2013 | Hickey et al. |
| 2013/0044117 A1 | 2/2013 | Mejdrich et al. |
| 2013/0046518 A1 | 2/2013 | Mejdrich et al. |
| 2013/0051397 A1 | 2/2013 | Guo et al. |
| 2013/0054811 A1 | 2/2013 | Harrand |
| 2013/0073771 A1 | 3/2013 | Hanyu et al. |
| 2013/0073878 A1 | 3/2013 | Jayasimha et al. |
| 2013/0080073 A1 | 3/2013 | de Corral |
| 2013/0080671 A1 | 3/2013 | Ishii et al. |
| 2013/0086399 A1 | 4/2013 | Tychon et al. |
| 2013/0103369 A1 | 4/2013 | Huynh et al. |
| 2013/0103912 A1 | 4/2013 | Jones et al. |
| 2013/0111190 A1 | 5/2013 | Muff et al. |
| 2013/0111242 A1 | 5/2013 | Heller et al. |
| 2013/0117543 A1 | 5/2013 | Venkataramanan et al. |
| 2013/0138925 A1 | 5/2013 | Hickey et al. |
| 2013/0145128 A1 | 6/2013 | Schardt et al. |
| 2013/0148506 A1 | 6/2013 | Lea |
| 2013/0151215 A1 | 6/2013 | Mustapha |
| 2013/0159668 A1 | 6/2013 | Muff et al. |
| 2013/0159669 A1 | 6/2013 | Comparan et al. |
| 2013/0159674 A1 | 6/2013 | Muff et al. |
| 2013/0159675 A1 | 6/2013 | Muff et al. |
| 2013/0159676 A1 | 6/2013 | Muff et al. |
| 2013/0159944 A1 | 6/2013 | Uno et al. |
| 2013/0160026 A1 | 6/2013 | Kuesel et al. |
| 2013/0160114 A1 | 6/2013 | Greenwood et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0185542 A1 | 7/2013 | Mejdrich et al. |
| 2013/0191572 A1 | 7/2013 | Nooney et al. |
| 2013/0191600 A1 | 7/2013 | Kuesel et al. |
| 2013/0191649 A1 | 7/2013 | Muff et al. |
| 2013/0191651 A1 | 7/2013 | Muff et al. |
| 2013/0191824 A1 | 7/2013 | Muff et al. |
| 2013/0191825 A1 | 7/2013 | Muff et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0305207 A1 | 11/2013 | Hsieh et al. |
| 2013/0311819 A1 | 11/2013 | Ishii et al. |
| 2013/0326458 A1 | 12/2013 | Kazda et al. |
| 2014/0013293 A1 | 1/2014 | Hsu et al. |
| 2014/0068132 A1 | 3/2014 | Philip et al. |
| 2014/0068134 A1 | 3/2014 | Philip et al. |
| 2014/0082237 A1 | 3/2014 | Wertheimer et al. |
| 2014/0086260 A1 | 3/2014 | Dai et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton et al. |
| 2014/0143557 A1 | 5/2014 | Kuesel et al. |
| 2014/0143558 A1 | 5/2014 | Kuesel et al. |
| 2014/0149720 A1 | 5/2014 | Muff et al. |
| 2014/0164465 A1 | 6/2014 | Muff et al. |
| 2014/0164704 A1 | 6/2014 | Kuesel et al. |
| 2014/0164732 A1 | 6/2014 | Muff et al. |
| 2014/0164734 A1 | 6/2014 | Muff et al. |
| 2014/0211622 A1 | 7/2014 | Kumar et al. |
| 2014/0229709 A1 | 8/2014 | Kuesel et al. |
| 2014/0229712 A1 | 8/2014 | Muff et al. |
| 2014/0229713 A1 | 8/2014 | Muff et al. |
| 2014/0229714 A1 | 8/2014 | Muff et al. |
| 2014/0229720 A1 | 8/2014 | Hickey et al. |
| 2014/0230077 A1 | 8/2014 | Muff et al. |
| 2014/0232188 A1 | 8/2014 | Cheriyan et al. |
| 2014/0241376 A1 | 8/2014 | Balkan et al. |
| 2014/0254388 A1 | 9/2014 | Kumar et al. |
| 2014/0281243 A1 | 9/2014 | Shalf et al. |
| 2014/0281402 A1 | 9/2014 | Comparan et al. |
| 2014/0307590 A1 | 10/2014 | Dobbelaere et al. |
| 2014/0359641 A1 | 12/2014 | Clark et al. |
| 2014/0376569 A1 | 12/2014 | Philip et al. |
| 2015/0020078 A1 | 1/2015 | Kuesel et al. |
| 2015/0026435 A1 | 1/2015 | Muff et al. |
| 2015/0026494 A1 | 1/2015 | Bainbridge et al. |
| 2015/0026500 A1 | 1/2015 | Muff et al. |
| 2015/0032988 A1 | 1/2015 | Muff et al. |
| 2015/0032999 A1 | 1/2015 | Muff et al. |
| 2015/0043575 A1 | 2/2015 | Kumar et al. |
| 2015/0081941 A1 | 3/2015 | Brown et al. |
| 2015/0103822 A1 | 4/2015 | Gianchandani et al. |
| 2015/0109024 A1 | 4/2015 | Abdelfattah et al. |
| 2015/0159330 A1 | 6/2015 | Weisman et al. |
| 2015/0178435 A1 | 6/2015 | Kumar |
| 2015/0331831 A1 | 11/2015 | Solihin |
| 2015/0348600 A1 | 12/2015 | Bhatia et al. |
| 2015/0381707 A1 | 12/2015 | How |
| 2017/0061053 A1 | 3/2017 | Kumar et al. |
| 2017/0063625 A1 | 3/2017 | Philip et al. |
| 2017/0063697 A1 | 3/2017 | Kumar |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Ababei, C., et al., Achieving Network on Chip Fault Tolerance by Adaptive Remapping, Parallel & Distributed Processing, 2009, IEEE International Symposium, 4 pgs.

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA'10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QOS Scheme for Networks-on-Chip, Micro '09, December Dec. 16, 2009,12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

(56) References Cited

OTHER PUBLICATIONS

Hestness, J., et al., Netrace: Dependency-Tracking for Efficient Network-on-Chip Experimentation, The University of Texas at Austin, Dept. of Computer Science, May 2011, 20 pgs.
Jiang, N., et al., Performance Implications of Age-Based Allocations in On-Chip Networks, CVA MEMO 129, May 24, 2011, 21 pgs.
Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li, B., et al., CoQoS: Coordinating QoS-Aware Shared Resources in NoC-based SoCs, J. Parallel Distrib. Comput., 71 (5), May 2011, 14 pgs.
Lin, S., et al., Scalable Connection-Based Flow Control Scheme for Application-Specific Network-on-Chip, The Journal of China Universities of Posts and Telecommunications, Dec. 2011, 18(6), pp. 98-105.
Bolotin, Evgency, et al., "QNoC: QoS Architecture and Design Process for Network on Chip" 2004,24 pages, Journal of Systems Architecture 50 (2004) 105-128 Elsevier.
Holsmark, Shashi Kumar Rickard, et al., "HiRA: A Methodology for Deadlock Free Routing in Hierarchical Networks on Chip", 10 pages, (978-1-4244-4143-3/09 2009 IEEE).
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Rajesh BV, Shivaputra, "NoC: Design and Implementation of Hardware Network Interface with Improved Communication Reliability", 7 pages, International Journal of VLSI and Embedded Systems, IJIVES (vol. 04, Article 06116; Jun. 2013).
Yang, J., et al., Homogeneous NoC-based FPGA: The Foundation for Virtual FPGA, 10th IEEE International Conference on Computer and Information Technology (CIT 2010), Jun. 2010, pp. 62-67.
Zaman, Aanam, "Formal Verification of Circuit-Switched Network on Chip (NoC) Architectures using SPIN", Oosman Hasan, IEEE © 2014, 8 pages.
Benini, Luca, et al., "Networks on Chips: A New SoC Paradigm", IEEE Computers, SOC Designs, pp. 70-78, Copyright 2002 IEEE. 0018-9162/02.
Sethuraman, Ranga Vemuri Balasubramanian, "optiMap: A Tool for Automated Generation of NoC Architecture Using Multi-Port Routers for FPGAs", IEEE, pp. 1-6, 2006.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
International Search Report and Written Opinion for PCT/US2014/023625, dated Jul. 10, 2014, 9 pgs.
International Preliminary Report on Patentability for International Application No. PCT/US2013/064140, dated Apr. 14, 2015, 5 pages.
Office Action for Korean Patent Application No. 10-2016-7019093 dated Sep. 8, 2016, 3 pages plus 1 page English translation. KIPO, Korea.
Notice of Allowance for for Korean Patent Application No. 10-2016-7019093 dated Sep. 8, 2016, 4 pages. KIPO, Korea.
International Search Report and Written Opinion for PCT/US2014/037902, dated Sep. 30, 2014, 14 pgs.
Office Action for Japanese Patent Application No. 2015-535898 dated Oct. 25, 2016, 2 pages English, 2 pages untranslated copy. Japan Patent Office.
Notice of Grant for Japanese Patent Application No. 2015-535898 dated Jan. 17, 2017, 3 pages, untranslated. Japan Patent Office.
International Search Report and Written Opinion for PCT/US2014/048190, dated Nov. 28, 2014, 11 pgs.
Office Action for Japanese Patent Application No. 2016-516030 dated Aug. 30, 2016, 2 pages, Japan Patent Office.
Decision to Grant for Japanese Patent Application No. 2016-516030 dated Nov. 22, 2016, 6 pages, untranslated, Japan Patent Office.

* cited by examiner

540 →

| DESIGN RULE CHECKS | | |
|---|---|---|
| ERRORS | WARNINGS | INFORMATIONS |

- SANITY ON PARTS [LABEL, WIDTH, DIRECTION]

- CLOCK, VOLTAGE, POWER, COMPATIBILITY

- TIMING CHECKS : PIPELINES, CLOCK, GRAVITY

- TOP LEVEL / INTERNAL PORT CONNECTIONS

OUTPUTS

1. GENERATED SoC CONNECTIONS /NoC IP/ WIDTH OR RTl HIERARCHY

2. XML FILE/IP XACT

3. COLLATERALS :
    - SYNTH (SDC)
    - PLACEMENT (DEP)
    - DOCUMENTATION REPORT

4. DESIGN RULES CHECK REPORT

5. REGISTER DESCRIPTION (XML, CSR...)

6. SYSTEM ADDRESS MAPPING

7. VERIFICATION CHECKERS

8. BFMs AND DRIVERS FOR SIMULATION

9. PERFORMANCE REPORT : AREA, WIRING, BANDWIDTH, LATENCY

SYSTEM ON CHIP (SOC) BUILDER

CROSS REFERENCE TO RELATED APPLICATION

This U.S. patent application is based on and claims the benefit of domestic priority under 35 U.S.C. 119(e) from provisional U.S. patent application No. 62/634,653, filed on Feb. 23, 2018, the disclosures of which is hereby incorporated by reference herein in its entirety.

BACKGROUND

Field

Methods and example implementations described herein are generally directed to an interconnect architecture, and more specifically, to System on Chip (SoC) design and verification system and method that constructs SoC from functional building blocks circuits while concurrently taking into account numerous chip level design aspects along with the generation of a simulation environment for design verification.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1A, 2-D (two dimensional) mesh (as shown in FIG. 1B), and 2-D Torus (as shown in FIG. 1C) are examples of topologies in the related art. Mesh and Torus can also be extended to 2.5-D (two and half dimensional) or 3-D (three dimensional) organizations. FIG. 1D shows a 3D mesh NoC, where there are three layers of 3x3 2D mesh NoC shown over each other. The NoC routers have up to two additional ports, one connecting to a router in the higher layer, and another connecting to a router in the lower layer. Router 111 in the middle layer of the example has its ports used, one connecting to the router 112 at the top layer and another connecting to the router 110 at the bottom layer. Routers 110 and 112 are at the bottom and top mesh layers respectively and therefore have only the upper facing port 113 and the lower facing port 114 respectively connected.

Packets are message transport units for intercommunication between various components. Routing involves identifying a path that is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2A pictorially illustrates an example of XY routing in a two dimensional mesh. More specifically, FIG. 2A illustrates XY routing from node '34' to node '00'. In the example of FIG. 2A, each component is connected to only one port of one router. A packet is first routed over the X-axis till the packet reaches node '04' where the X-coordinate of the node is the same as the X-coordinate of the destination node. The packet is next routed over the Y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is a header flit, which holds information about this packet's route and key message level info along with payload data and sets up the routing behavior for all subsequent flits associated with the message. Optionally, one or more body flits follows the header flit, containing remaining payload of data. The final flit is a tail flit, which, in addition to containing last payload, also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there exist multiple route paths of equal length or number of hops between any pair of source and destination nodes. For example, in FIG. 2B, in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3A illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3B, a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right design point for a given system remains challenging and remains a time consuming manual process, and often the resulting designs remains sub-optimal and inefficient. A number of innovations to address these problems are described in U.S. patent application Ser. Nos. 13/658,663, 13/752,226, 13/647,557, 13/856,835, 13/723,732, the contents of which are hereby incorporated by reference in their entirety.

System on Chips (SoCs) are becoming increasingly sophisticated, feature rich, and high performance by integrating a growing number of standard processor cores, memory and I/O subsystems, and specialized acceleration IPs. To address this complexity, NoC approach of connecting SoC components is gaining popularity. A NoC can provide connectivity to a plethora of components and interfaces and simultaneously enable rapid design closure by being automatically generated from a high level specification. The specification describes interconnect requirements of SoC in terms of connectivity, bandwidth, and latency. In addition to this, information such as position of various components such as bridges or ports on boundary of hosts, traffic information, chip size information, etc. may be supplied. A NoC compiler (topology generation engine) can then use this specification to automatically design a NoC for the SoC. A number of NoC compilers were introduced in the related art that automatically synthesize a NoC to fit a traffic specification. In such design flows, the synthesized NoC is simulated to evaluate the performance under various operating conditions and to determine whether the specifications are met. This may be necessary because NoC-style interconnects are distributed systems and their dynamic performance characteristics under load are difficult to predict statically and can be very sensitive to a wide variety of parameters. Specifications can also be in the form of power specifications to define power domains, voltage domains, clock domains, and so on, depending on the desired implementation.

Placing hosts/IP cores in a SoC floorplan to optimize the interconnect performance can be important. For example, if two hosts communicate with each other frequently and require higher bandwidth than other interconnects, it may be better to place them closer to each other so that the transactions between these hosts can go over fewer router hops and links and the overall latency and the NoC cost can be reduced.

Assuming that two hosts with certain shapes and sizes cannot spatially overlap with each other on a 2D SoC plane, tradeoffs may need to be made. Moving certain hosts closer to improve inter-communication between them, may force certain other hosts to be further apart, thereby penalizing inter-communication between those other hosts. To make tradeoffs that improve system performance, certain performance metrics such as average global communication latency may be used as an objective function to optimize the SoC architecture with the hosts being placed in a NoC topology. Determining substantially optimal host positions that maximizes the system performance metric may involve analyzing the connectivity and inter-communication properties between all hosts and judiciously placing them onto the 2D NoC topology. In case if inter-communicating hosts are placed far from each other, this can leads to high average and peak structural latencies in number of hops. Such long paths not only increase latency but also adversely affect the interconnect bandwidth, as messages stay in the NoC for longer periods and consume bandwidth of a large number of links.

In large-scale networks, efficiency and performance/area tradeoff is of main concern. Mechanisms such as machine learning approach, simulated annealing, among others, provide optimized topology for a system. However, such complex mechanisms have substantial limitations as they involve certain algorithms to automate optimization of layout network, which may violate previously mapped flow's latency constraint or the latency constraint of current flow. Further, it is also to be considered that each user has their own requirements and/or need for SoCs and/or NoCs depending on a diverse applicability of the same. Therefore, there is a need for systems and methods that significantly improve system efficiency by accurately indicating the best possible positions and configurations for hosts and ports within the hosts, along with indicating system level routes to be taken for traffic flows using the NoC interconnect architecture. Systems and methods are also required for automatically generating an optimized topology for a given SoC floor plan and traffic specification with an efficient layout. Further, systems and methods are also required that allows users to specify their requirements for a particular SoC and/or NoC, provides various options for satisfying their requirements and based on this automatically generating an optimized topology for a given SoC floor plan and traffic specification with an efficient layout.

Furthermore, a system and method is required that facilitates efficient creation of SoC designs utilizing existing circuit block information. The system and method should assist a designer to design SoC in a convenient manner and facilitate incorporation of building block circuits previously tested in silicon. The system and method should reduce the amount of data a user has to enter manually to adequately describe features of the circuit being designed or analyzed Therefore, there exists a need for methods, systems, and computer readable mediums for overcoming the above-mentioned issues with existing implementations of generating topology for a given NoC/SoC.

SUMMARY

Methods and example implementations described herein are generally directed to an interconnect architecture, and more specifically, to System on Chip (SoC) design and verification system and method that constructs SoC from functional building blocks circuits while concurrently taking into account numerous chip level design aspects along with the generation of a simulation environment for design verification.

Aspects of the present disclosure relate to methods, systems, and computer readable mediums for overcoming the above-mentioned issues with existing implementations of generating topology for a given SoC by significantly improving system efficiency by facilitating efficient creation of SoC designs utilizing existing or new circuit block information. The system and method assist a designer to design SoC in a convenient manner and facilitate incorporation of building block circuits previously tested in silicon. The system and method reduces the amount of data a user has to enter manually to adequately describe features of the circuit being designed or analyzed Further, methods, systems, and computer readable mediums are provided that facilitates efficient and effective creation, modification and verification of electrical circuit designs utilizing a new or existing circuit block designs. The System on Chip (SoC) builder and verification system and method of the present invention assists a designer to design a System on Chip (SoC) in a convenient manner and facilitates incorporation of building block circuits that have been previously verified and tested in silicon. The SoC builder and verification system and method minimizes the amount of data a user has to enter manually to adequately describe features of the circuit being designed or verified. The present invention system and method automatically provides a chip level description, a test bench, clock descriptions, test logic descriptions, simulation models, and simulation environments.

An aspect of the present disclosure relates to a method for generating a System on Chip (SoC) from a floor plan having one or more integration descriptions. The method includes the steps of generating one or more connections between the integration descriptions of the floor plan based at least on a traffic specification, and conducting a design check process on the floor plan. If the design check process on the floor plan is indicative of passing the design check process, then the method generates the SoC according to the one or more connections generated between the integration descriptions. If the design check process on the floor plan is indicative of not passing the design check process, then the method generates a report indicative of not passing.

In an aspect, the integration descriptions include information derived from the hardware IP to construct at least a NoC for integration into at least one SoC. In another aspect, the at least one integration description is selected from said one or more integration descriptions of the hardware IP based at least on an input received from one or more users. In an aspect, the input is in a form of a file selected from any or combination of an XML file, an IP XACT file, a verilog file, a meta-data file or a file in a prescribed or pre-defined format.

In an aspect, the report includes any or combination of at least an error, a warning, and information associated with the design check process for not passing In an aspect, the method is implemented in a computing device or a cloud server.

In an aspect, the method can generate connections associated with any or combination of a NoC, an crossbar, and direct connections.

In an aspect, the method can generate one or more connection bundles. In another aspect, the one or more connection bundles are generated by determining information associated with one or more ports associated with the one or more connections, performing protocol based template discovery to obtain one or more sets of pins associated with a particular protocol, and performing manual override on said sets of pins based at least on a bandwidth constraint, or a native connection, or a NoC based connection, or any combination thereof.

In an aspect, the method can generate one or more groups associated with one or more connection bundles.

In an aspect, the method can connect said one or more connection bundles based on pre-determined criteria. In another aspect, at least one connection selected from said one or more connection bundles include a label.

In an aspect, the method can generate one or more domain regions for the floor plan. In another aspect, the method can generate the SoC using one or more domain regions generated for the floor plan.

In an aspect, the method can generate any or combination of SoC connections, NoC IP, RTL hierarchy, XML file/IP XACT file, one or more collaterals such as lists, design rules check report, register descriptions, system address mapping, verification checkers, drivers for simulations, and performance reports.

In an aspect, the design check process can include a pre-defined set of checklist or rules associated with any or combination of a sanity of ports, clock compatibility, power compatibility, voltage compatibility, timing checks, internal port connections checks, a traffic check, a bandwidth check, and a protocol check.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

In an aspect, the method can display dependencies of the at least one integration description selected on the other integration descriptions selected from said one or more integration descriptions.

An aspect of the present disclosure relates to a system to generate a System on Chip (SoC) from a floor plan having one or more integration descriptions. The system includes a generation module to generate one or more connections between the integration descriptions of the floor plan based at least on a traffic specification, and to conduct a design check process on the floor plan. If the design check process on the floor plan is indicative of passing the design check process, then the method generates the SoC according to the one or more connections generated between the integration descriptions. If the design check process on the floor plan is indicative of not passing the design check process, then the method generates a report indicative of not passing.

In an aspect, the integration descriptions include information derived from the hardware IP to construct at least a NoC for integration into at least one SoC. In another aspect, the at least one integration description is selected from said one or more integration descriptions of the hardware IP based at least on an input received from one or more users. In an aspect, the input is in a form of a file selected from any or combination of an XML file, a verilog file, a meta-data file or a file in a prescribed or pre-defined format.

In an aspect, the report includes any or combination of at least an error, a warning, and information associated with the design check process for not passing In an aspect, the system is a computing device or a cloud server.

In an aspect, the system can generate connections associated with any or combination of a NoC, an crossbar, and direct connections.

In an aspect, the system can generate one or more connection bundles. In another aspect, the one or more connection bundles are generated by determining information associated with one or more ports associated with the one or more connections, performing protocol based template discovery to obtain one or more sets of pins associated with a particular protocol, and performing manual override on said sets of pins based at least on a bandwidth constraint, or a native connection, or a NoC based connection, or any combination thereof.

In an aspect, the system can generate one or more groups associated with one or more connection bundles.

In an aspect, the system can connect said one or more connection bundles based on pre-determined criteria. In another aspect, at least one connection selected from said one or more connection bundles include a label.

In an aspect, the system can generate one or more domain regions for the floor plan. In another aspect, the method can generate the SoC using one or more domain regions generated for the floor plan.

In an aspect, the system can generate any or combination of SoC connections, NoC IP, RTL hierarchy, XML file/IP XACT file, one or more collaterals such as lists, design rules check report, register descriptions, system address mapping, verification checkers, drivers for simulations, and performance reports.

In an aspect, the design check process can include a pre-defined set of checklist or rules associated with any or combination of a sanity of ports, clock compatibility, power compatibility, voltage compatibility, timing checks, internal port connections checks, a traffic check, a bandwidth check, and a protocol check.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

In an aspect, the system can display dependencies of the at least one integration description selected on the other integration descriptions selected from said one or more integration descriptions.

An aspect of the present disclosure relates to a non-transitory computer readable storage medium storing instructions for executing a process. The instructions include the steps of generating one or more connections between the integration descriptions of the floor plan based at least on a traffic specification, and conducting a design check process on the floor plan. If the design check process on the floor plan is indicative of passing the design check process, then the method generates the SoC according to the one or more connections generated between the integration descriptions. If the design check process on the floor plan is indicative of not passing the design check process, then the method generates a report indicative of not passing.

The foregoing and other objects, features and advantages of the example implementations will be apparent and the following more particular descriptions of example implementations as illustrated in the accompanying drawings wherein like reference numbers generally represent like parts of example implementations of the application.

BRIEF DESCRIPTION OF DRAWINGS

FIGS. 5B-5D illustrates an input, design rule checks (DRCs), and an output generated, respectively, while generating a System on Chip (SoC) from a floor plan.

DETAILED DESCRIPTION

Figure 1A:
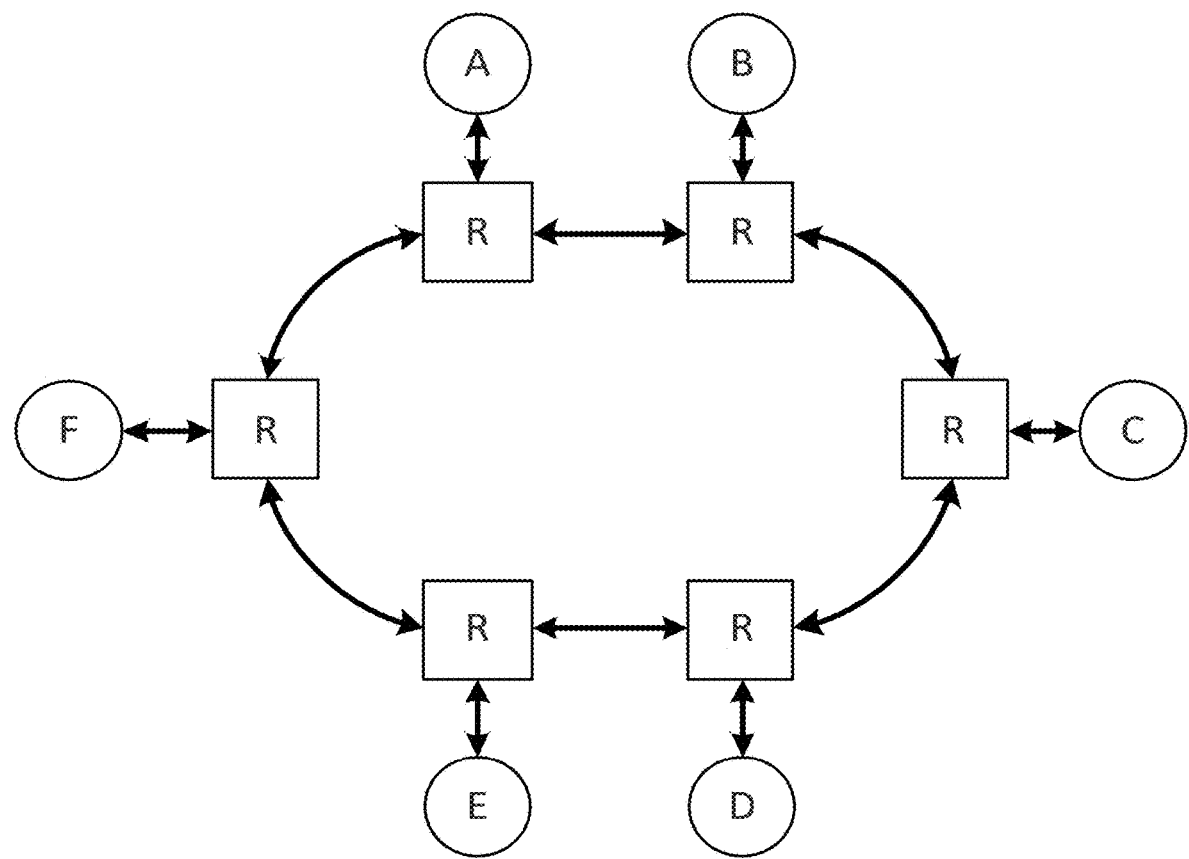
FIGS. 1A, 1B, 1C, and 1D illustrate examples of Bidirectional ring, 2D Mesh, 2D Torus, and 3D Mesh NoC Topologies.
Figure 1B:
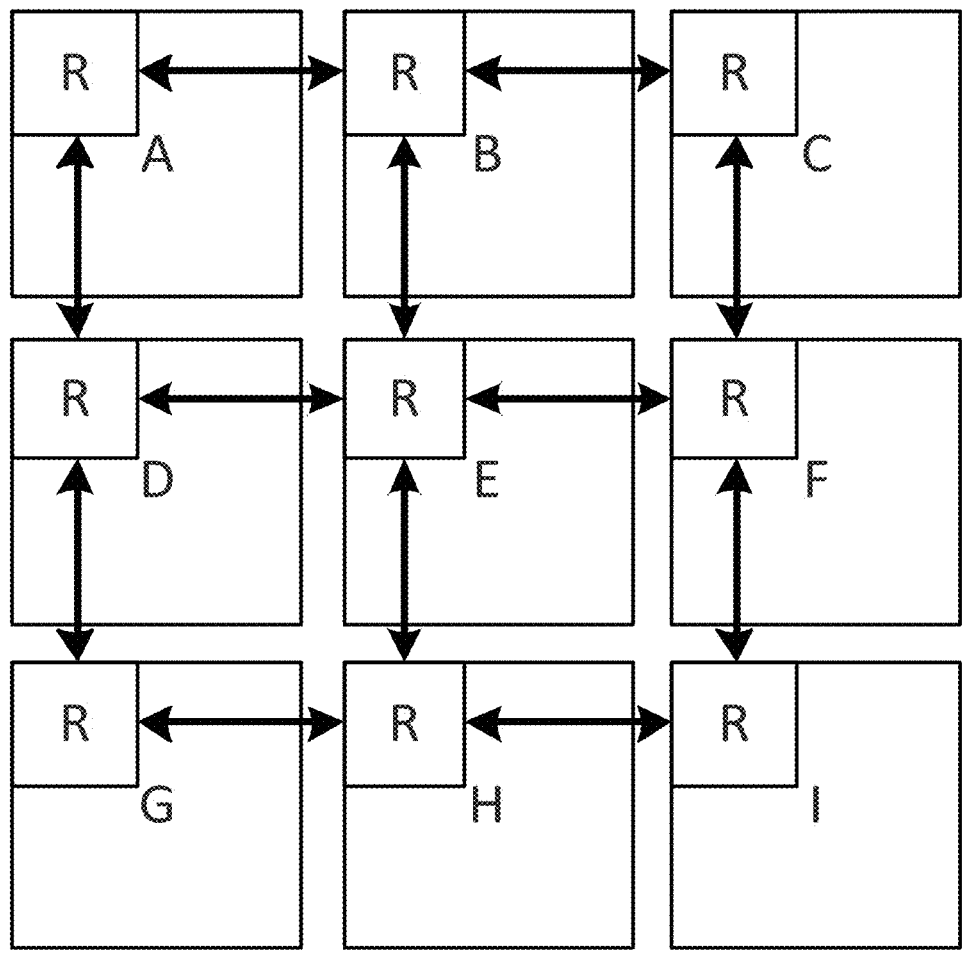
Figure 1C:
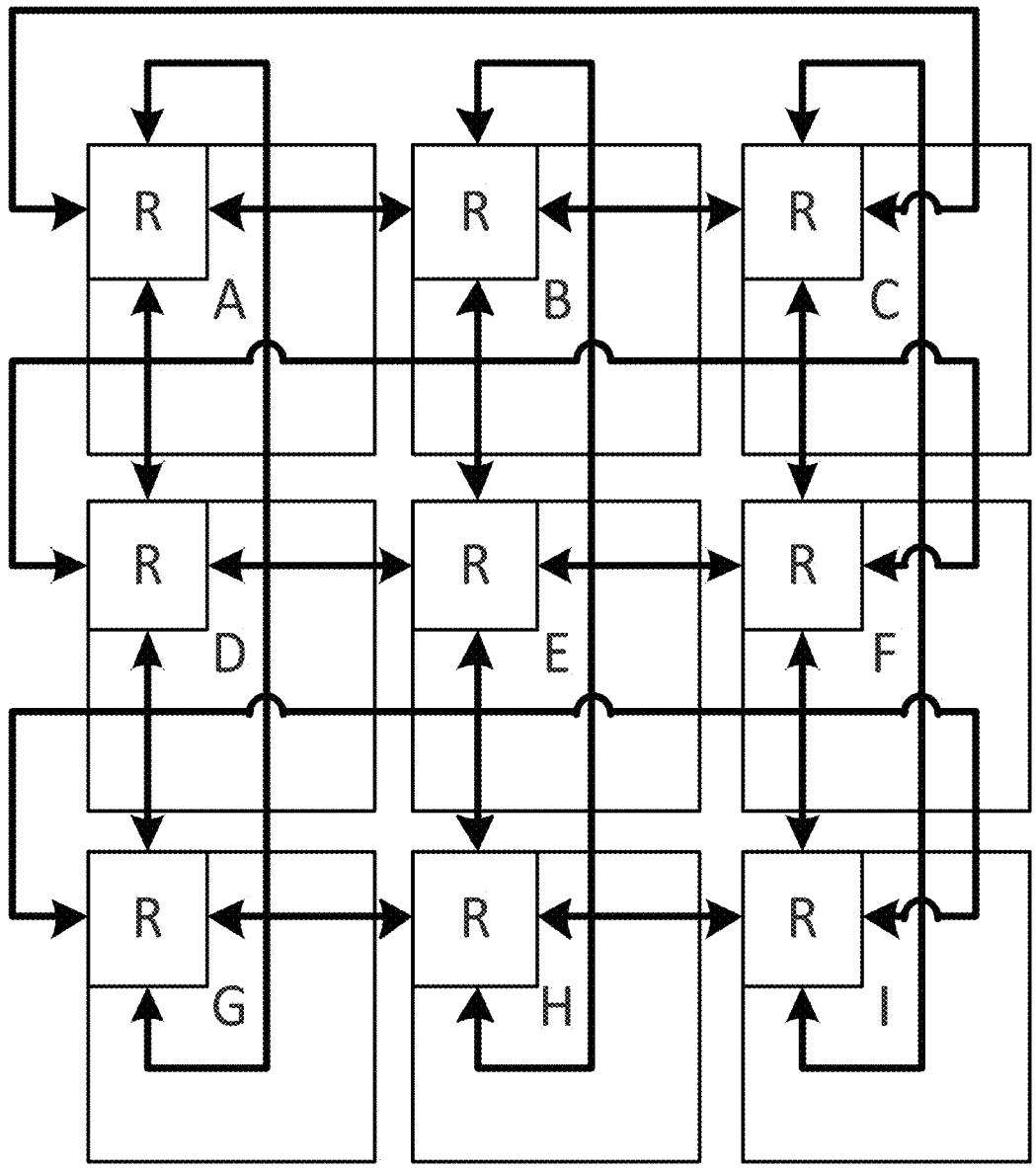
Figure 1D:
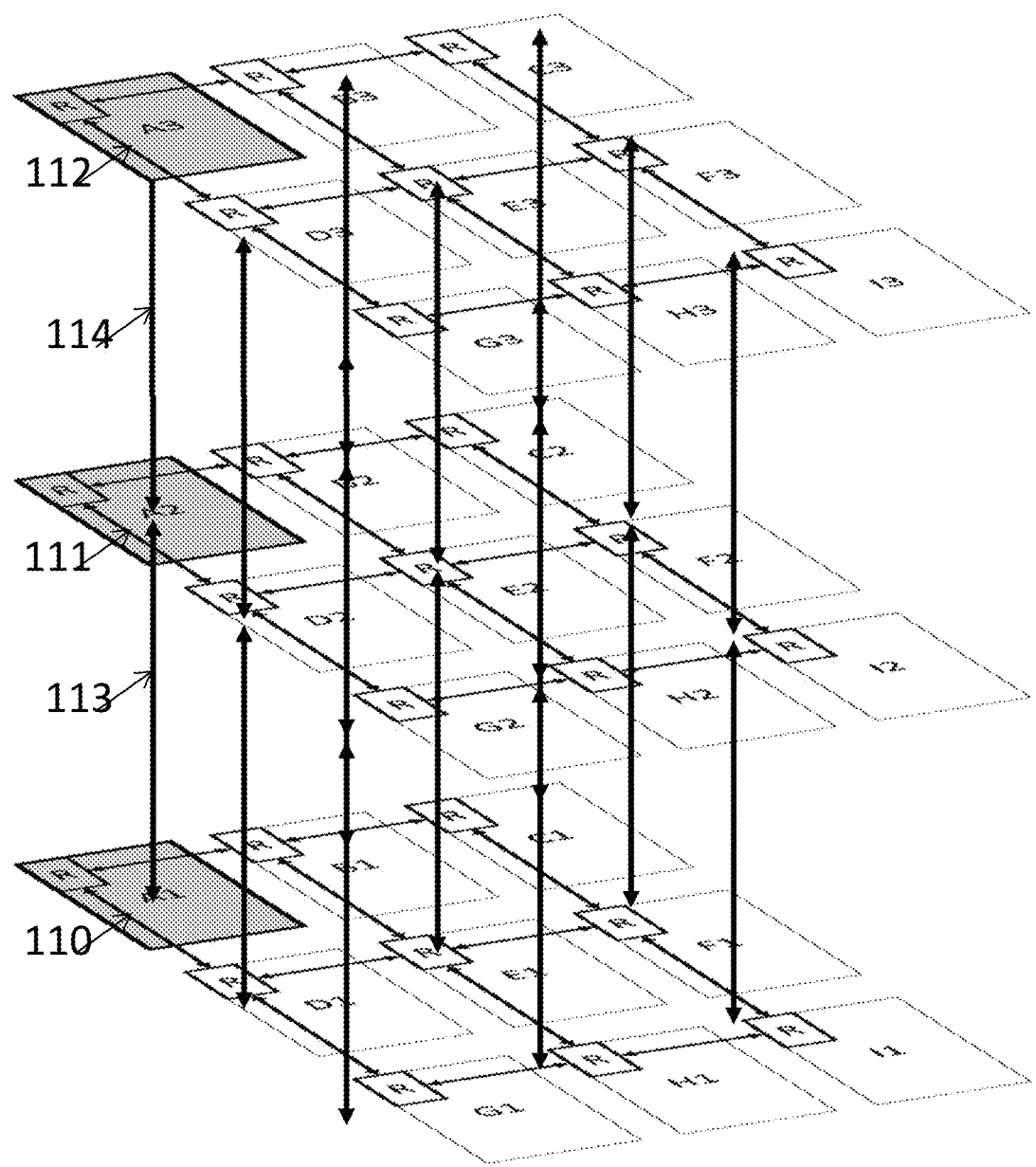
Figure 2A:
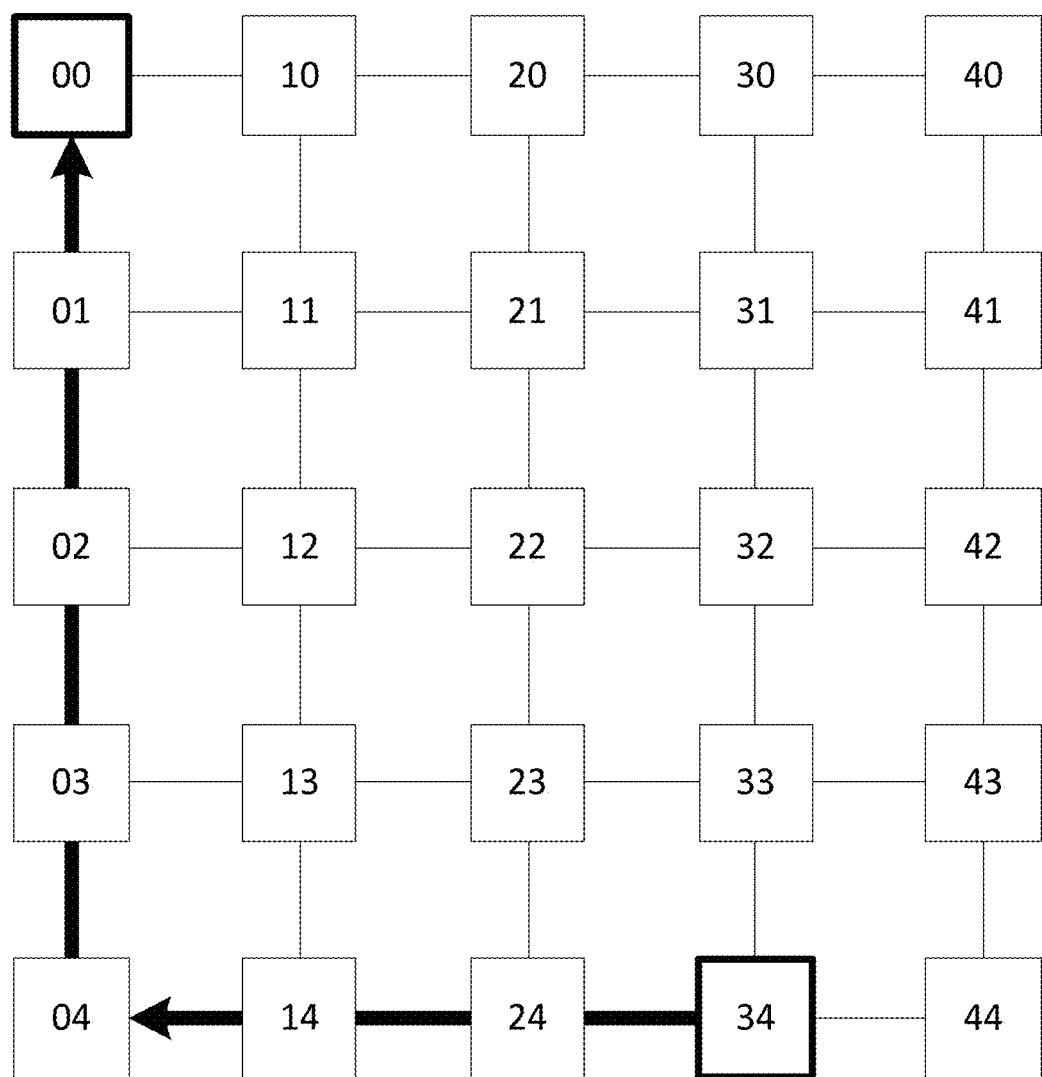
FIG. 2A illustrates an example of XY routing in a related art two dimensional mesh.
Figure 2B:
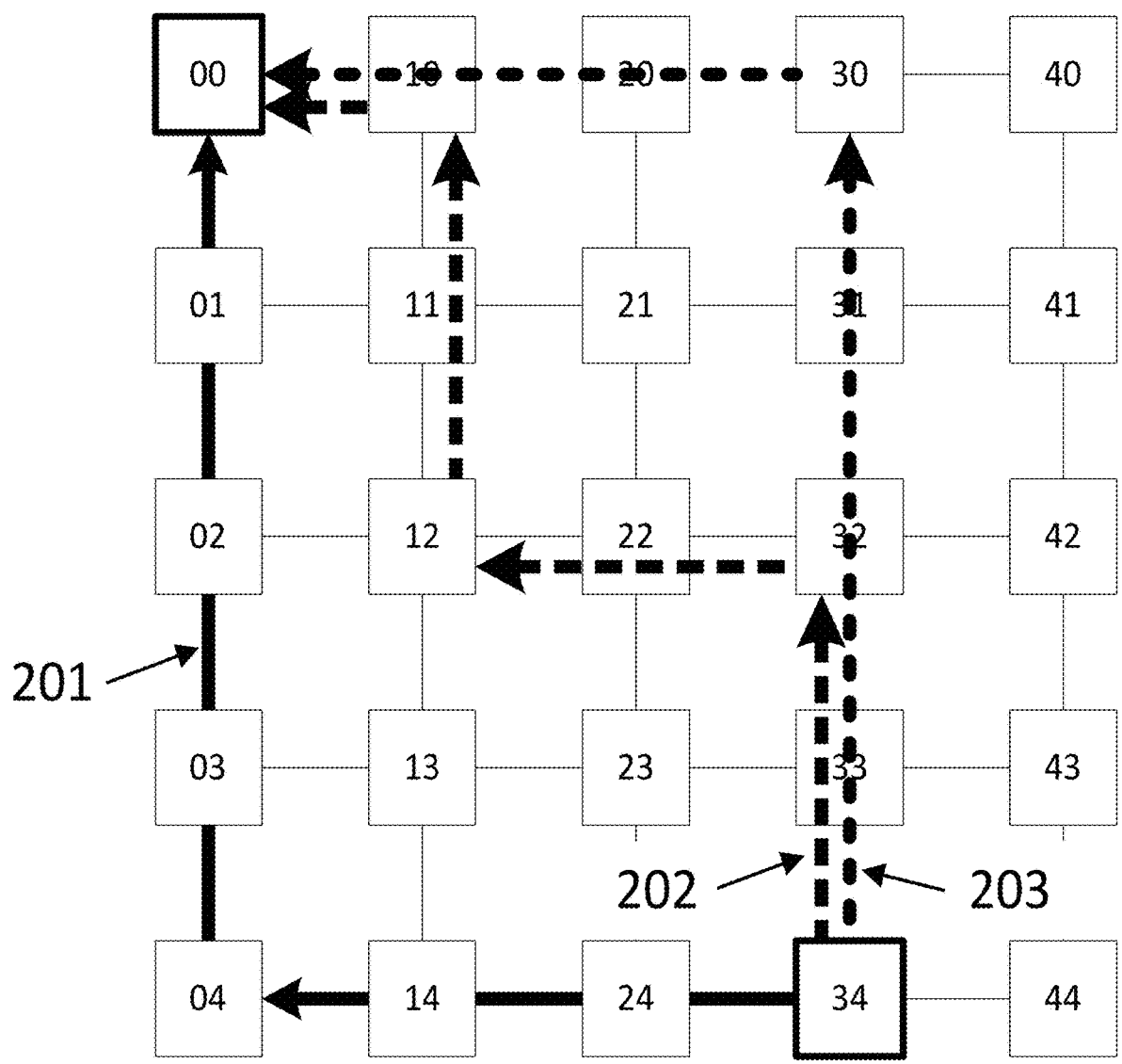
FIG. 2B illustrates three different routes between a source and destination nodes.
Figure 3A:
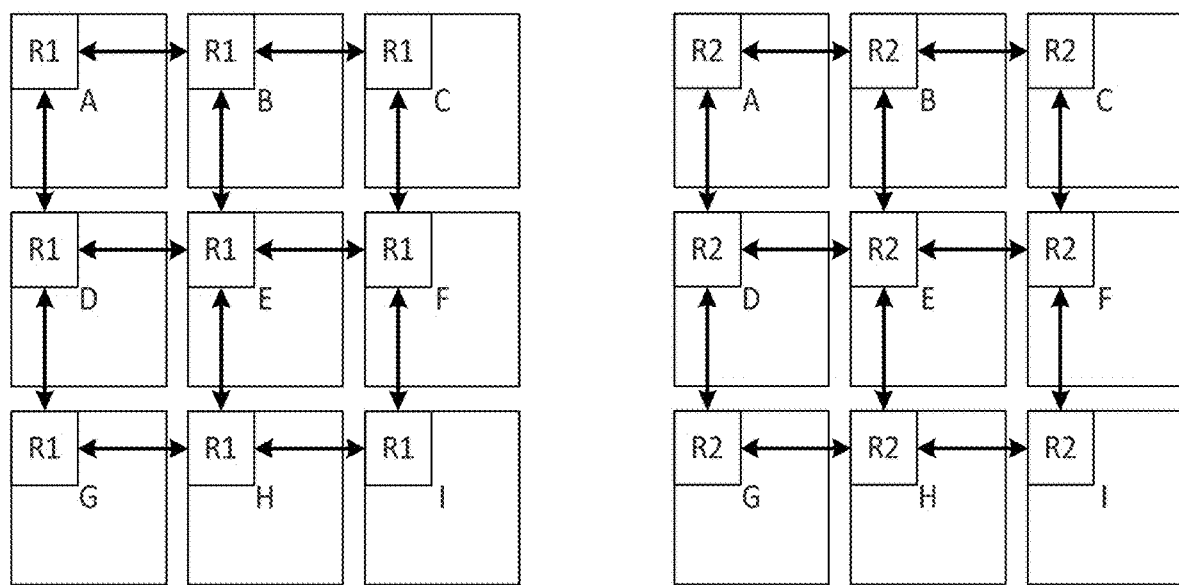
FIG. 3A illustrates an example of a related art two layer NoC interconnect.
Figure 3B:
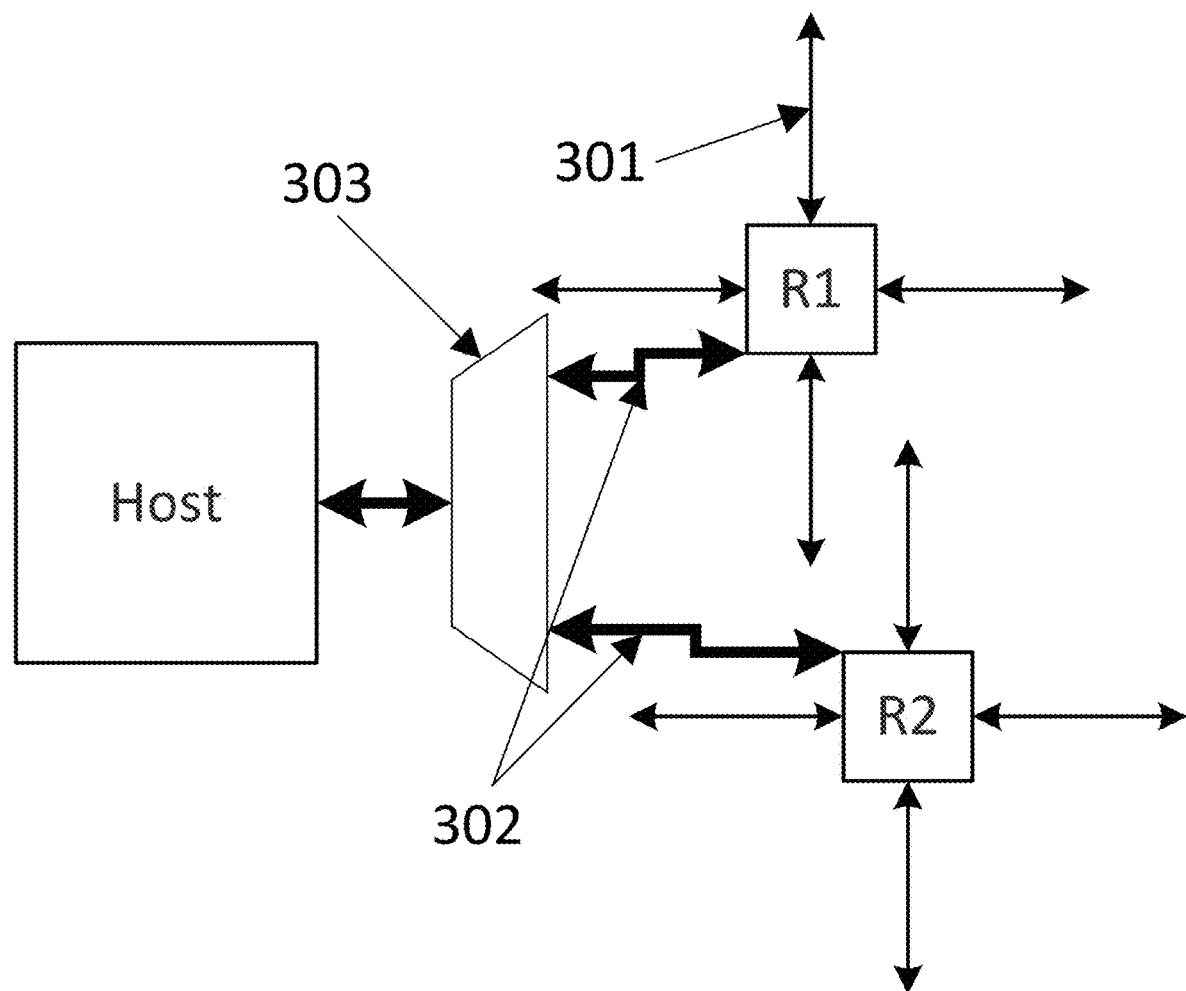
FIG. 3B illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Network-on-Chip (NoC) has emerged as a paradigm to interconnect a large number of components on the chip. NoC is a global shared communication infrastructure made up of several routing nodes interconnected with each other using point-to-point physical links. In example implementations, a NoC interconnect is generated from a specification by utilizing design tools. The specification can include constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections, etc. depending on the desired implementation. Specifications can also be in the form of power specifications to define power domains, voltage domains, clock domains, and so on, depending on the desired implementation.

Methods and example implementations described herein are generally directed to an interconnect architecture, and more specifically, to System on Chip (SoC) design and verification system and method that constructs SoC from functional building blocks circuits while concurrently taking into account numerous chip level design aspects along with the generation of a simulation environment for design verification.

Aspects of the present disclosure relate to methods, systems, and computer readable mediums for overcoming the above-mentioned issues with existing implementations of generating topology for a given SoC by significantly improving system efficiency by facilitating efficient creation of SoC designs utilizing existing or new circuit block information. The system and method assist a designer to design SoC in a convenient manner and facilitate incorporation of building block circuits previously tested in silicon. The system and method reduces the amount of data a user has to enter manually to adequately describe features of the circuit being designed or analyzed Further, methods, systems, and computer readable mediums are provided that facilitates efficient and effective creation, modification and verification of electrical circuit designs utilizing a new or existing circuit block designs. The System on Chip (SoC) builder and verification system and method of the present invention assists a designer to design a System on Chip (SoC) in a convenient manner and facilitates incorporation of building block circuits that have been previously verified and tested in silicon. The SoC builder and verification system and method minimizes the amount of data a user has to enter manually to adequately describe features of the circuit being designed or verified.

The present invention system and method automatically provides a chip level description, a test bench, clock descriptions, test logic descriptions, simulation models, and simulation environments.

An aspect of the present disclosure relates to a method for generating a System on Chip (SoC) from a floor plan having one or more integration descriptions. The method includes the steps of generating one or more connections between the integration descriptions of the floor plan based at least on a traffic specification, and conducting a design check process on the floor plan. If the design check process on the floor plan is indicative of passing the design check process, then the method generates the SoC according to the one or more connections generated between the integration descriptions. If the design check process on the floor plan is indicative of not passing the design check process, then the method generates a report indicative of not passing.

In an aspect, the integration descriptions include information derived from the hardware IP to construct at least a NoC for integration into at least one SoC. In another aspect, the at least one integration description is selected from said one or more integration descriptions of the hardware IP based at least on an input received from one or more users. In an aspect, the input is in a form of a file selected from any or combination of an XML file, a verilog file, a meta-data file or a file in a prescribed format.

In an aspect, the report includes any or combination of at least an error, a warning, and information associated with the design check process for not passing In an aspect, the method is implemented in a computing device or a cloud server.

In an aspect, the method can generate connections associated with any or combination of a NoC, an crossbar, and direct connections.

In an aspect, the method can generate one or more connection bundles. In another aspect, the one or more connection bundles are generated by determining information associated with one or more ports associated with the one or more connections, performing protocol based template discovery to obtain one or more sets of pins associated with a particular protocol, and performing manual override on said sets of pins based at least on a bandwidth constraint, or a native connection, or a NoC based connection, or any combination thereof.

In an aspect, the method can generate one or more groups associated with one or more connection bundles.

In an aspect, the method can connect said one or more connection bundles based on pre-determined criteria. In another aspect, at least one connection selected from said one or more connection bundles include a label.

In an aspect, the method can generate one or more domain regions for the floor plan. In another aspect, the method can generate the SoC using one or more domain regions generated for the floor plan.

In an aspect, the method can generate any or combination of SoC connections, NoC IP, RTL hierarchy, XML file/IP XACT file, one or more collaterals such as lists, design rules check report, register descriptions, system address mapping, verification checkers, drivers for simulations, and performance reports.

In an aspect, the design check process can include a pre-defined set of checklist or rules associated with any or combination of a sanity of ports, clock compatibility, power compatibility, voltage compatibility, timing checks, internal port connections checks, a traffic check, a bandwidth check, and a protocol check.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

In an aspect, the method can display dependencies of the at least one integration description selected on the other integration descriptions selected from said one or more integration descriptions.

An aspect of the present disclosure relates to a system to generate a System on Chip (SoC) from a floor plan having one or more integration descriptions. The system includes a generation module to generate one or more connections between the integration descriptions of the floor plan based at least on a traffic specification, and to conduct a design check process on the floor plan. If the design check process on the floor plan is indicative of passing the design check process, then the method generates the SoC according to the one or more connections generated between the integration descriptions. If the design check process on the floor plan is indicative of not passing the design check process, then the method generates a report indicative of not passing.

In an aspect, the integration descriptions include information derived from the hardware IP to construct at least a NoC for integration into at least one SoC. In another aspect, the at least one integration description is selected from said one or more integration descriptions of the hardware IP based at least on an input received from one or more users. In an aspect, the input is in a form of a file selected from any or combination of an XML file, a verilog file, a meta-data file or a file in a prescribed format.

In an aspect, the report includes any or combination of at least an error, a warning, and information associated with the design check process for not passing In an aspect, the system is a computing device or a cloud server.

In an aspect, the system can generate connections associated with any or combination of a NoC, an crossbar, and direct connections.

In an aspect, the system can generate one or more connection bundles. In another aspect, the one or more connection bundles are generated by determining information associated with one or more ports associated with the one or more connections, performing protocol based template discovery to obtain one or more sets of pins associated with a particular protocol, and performing manual override on said sets of pins based at least on a bandwidth constraint, or a native connection, or a NoC based connection, or any combination thereof.

In an aspect, the system can generate one or more groups associated with one or more connection bundles.

In an aspect, the system can connect said one or more connection bundles based on pre-determined criteria. In another aspect, at least one connection selected from said one or more connection bundles include a label.

In an aspect, the system can generate one or more domain regions for the floor plan. In another aspect, the method can generate the SoC using one or more domain regions generated for the floor plan.

In an aspect, the system can generate any or combination of SoC connections, NoC IP, RTL hierarchy, XML file/IP XACT file, one or more collaterals such as lists, design rules check report, register descriptions, system address mapping, verification checkers, drivers for simulations, and performance reports.

In an aspect, the design check process can include a pre-defined set of checklist or rules associated with any or combination of a sanity of ports, clock compatibility, power compatibility, voltage compatibility, timing checks, internal port connections checks, a traffic check, a bandwidth check, and a protocol check.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

In an aspect, the system can display dependencies of the at least one integration description selected on the other integration descriptions selected from said one or more integration descriptions.

An aspect of the present disclosure relates to a non-transitory computer readable storage medium storing instructions for executing a process. The instructions include the steps of generating one or more connections between the integration descriptions of the floor plan based at least on a traffic specification, and conducting a design check process on the floor plan. If the design check process on the floor plan is indicative of passing the design check process, then the method generates the SoC according to the one or more connections generated between the integration descriptions. If the design check process on the floor plan is indicative of not passing the design check process, then the method generates a report indicative of not passing.

In one embodiment of the present invention, a SoC builder and verification system and method is implemented in a computer system. The SoC builder and verification system and method include a graphical user interface (GUI). The GUI module provides user friendly and convenient interfaces that facilitate easy entry and modification of user selections and parameters. In one embodiment the present invention also accommodates text file entry of parameters. The system can analyze information supplied by the GUI module to interpret the user selections and parameterization (e.g., creates directions (command lines) passed to other modules for execution). The system utilizes information derived from past experience designing, manufacturing and verifying circuit blocks to automatically provide circuit block descriptions and parameters from a storage source (e.g., database, distributed resource, memory, etc.). The system automatically generates a chip level list, including the instantiation of internal IC devices and connections between the circuit blocks for internal signals. In one embodiment of the present invention, the system also includes a verification module that automatically verifies the behavior of the modeled SoC.

The present invention permits a designer to efficiently and effectively create and modify system on a chip (SoC) designs. The system and method of the present invention facilitates SoC design and verification by providing significant automation of a number of operations including circuit block integration, parameter assignment, addition of architecture features, verification testing and production test support. The present system and method enables a user to convey information conveniently in a manner that minimizes the amount of data a user has to enter manually while adequately describing features of the circuit being designed or analyzed. The present invention also includes automated expert system features that facilitate SoC design and testing. The expert system features facilitates the automated provision of design features based upon prior experience associated with actual SoC hardware manufacturing. It allows a user to easily create and modify design features with reduced manual data entry associated with creating files and performing verification functions. The present invention facilitates the automated creation of description files and logical verification environments including chip models and system level models for testing operations.

Figure 4A:
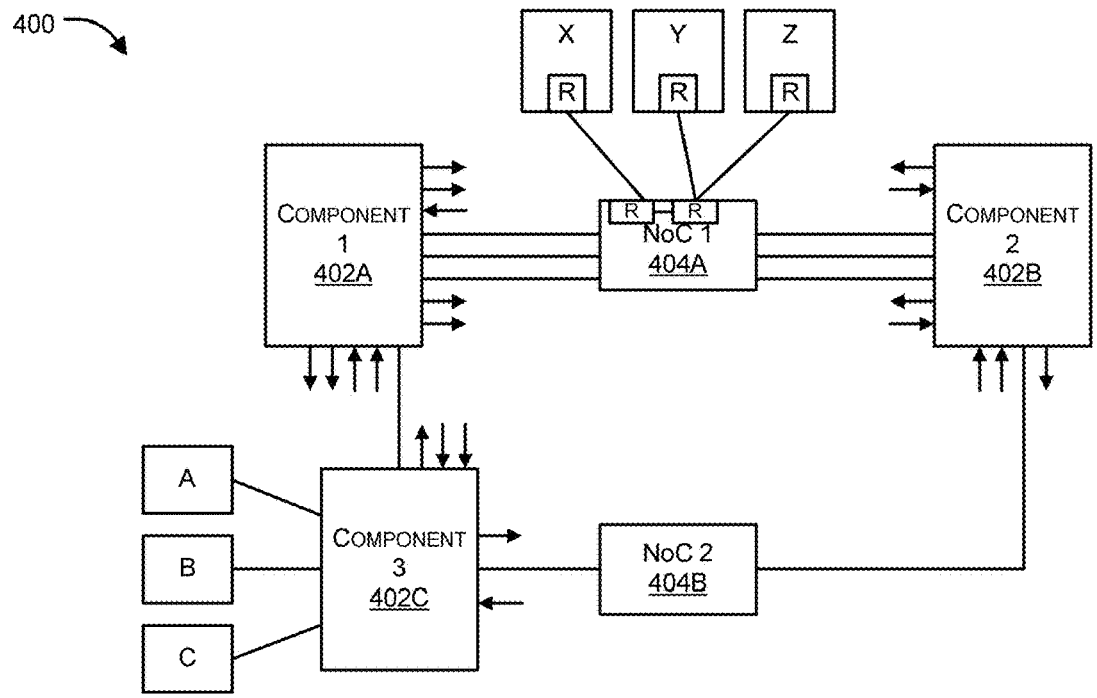
FIG. 4A-B illustrates a SoC connections and factors that determine a need of a NoC.
Figure 4B:
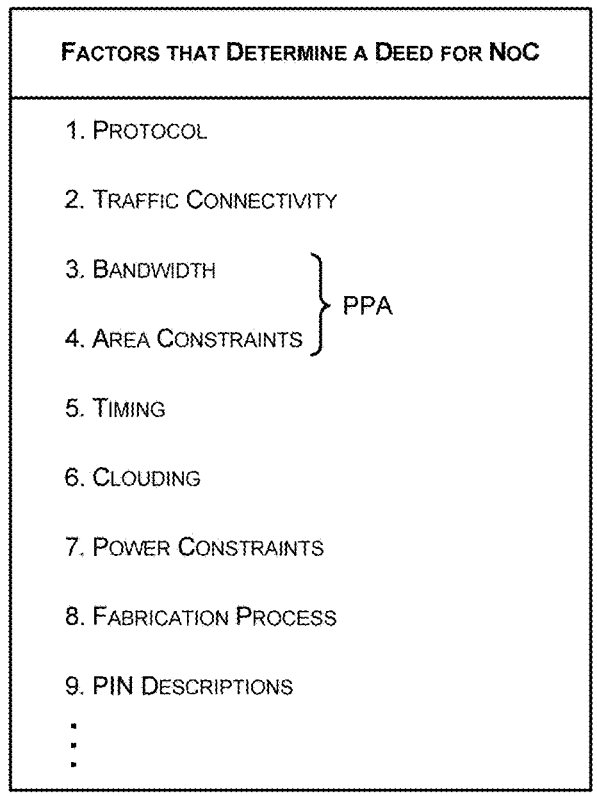

FIG. 4A-B illustrates a SoC connections and factors that determine a need of a NoC.

Referring now to FIG. 4A, an example system 400 having a plurality of SoC components is provided. As shown, component 1 402A, component 2 402B and component 3 402C are connected to each other via various connection means. Also, component 1, component 2 and components 3 include various ports and connections lines allowing their association with the other neighboring components.

Component 1 402A is connected to component 2 402B via NoC 1 404A whereas component 2 402B is connected to component 3 402C via NoC 2 404B. In this example, component 1 402A is connected to component 3 402C without utilizing any NoC.

It may be appreciated that each of these components can be further connected to various other components with or without utilization of a NoC. For example, Component 3 is connected to other Component like "a", "b", and "c", whereas the NoC 1 404A is connected to other components like "X", "Y", and "Z".

It may be also noted that, if there are various components in a system, some of these things need to communicate with NoC while some of them do not have to go though the NoC but are connected via wires.

The SoC designer needs to figure out which part needs to connect through the NoC and which needs to go directly/connect through wires, which can be a cumbersome task since these scenarios are battery dependent. For example, if one component interacts with multiple agents and then to optimize the paths is a challenge as compared to one to one connection between the components. Thus, there is a need of a system, method, device, tool, platform, and computer program product that understands the requirements of the SoC designer, optimizes them and builds an optimized SoC for the designer. For example, the computer program should be configured to assist the designer about where to have NoC and where not to have connections.

According to the related art approach, the designers connect wires manually and then check their feasibility. In contrast to this, the example implementations described herein provide an automated mechanism with a standardized interface for making these connections in real-time, which also includes error checking in real time and has a comprehensive design rule checks to confirm the design may violate any fundamentals principles of design or any of your own designs.

Thus, the present application provides a system and method that enable a user to decide how connections are made and where NoC can be utilized or direct connections are required while building an optimized SoC.

FIG. 4B illustrates an example list of factors 450 that determine the need for the NoC during SoC construction. In an example implementation, the factors can include various parameters such as, but are not limited to, the protocol to be implemented/used in a NoC, traffic connectivity between two agents/routers/components, bandwidth and/or area constraints, timing constraints, clocking synchronization/constraint, power constraint, fabrication constraint, pin and ports description/constraint and the like.

Since there is no standard technique that allows different designers to use standards for connecting or using NoC at particular point or connections at particular point, every designer has their own technique of doing that and then a single person combines all these different techniques to form a single NoC. Thus the present invention by way of system and method allows providing a standardized specification to enable optimized connections.

Figure 5A:
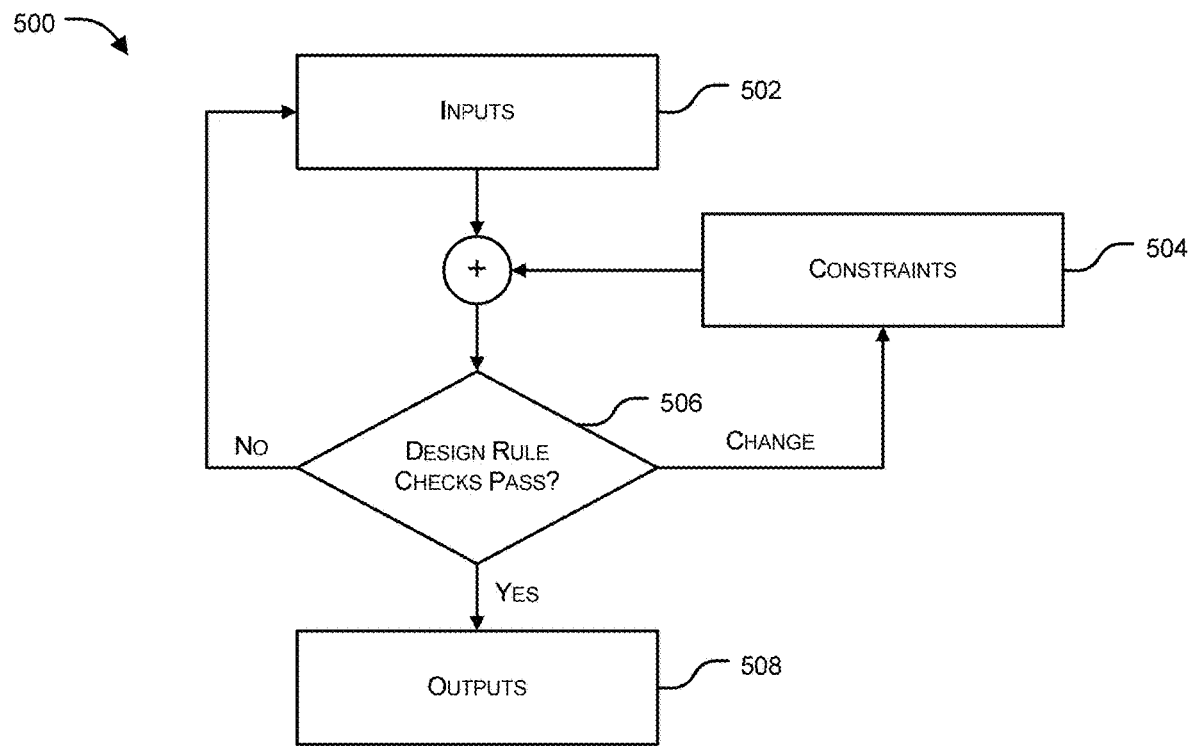
FIG. 5A illustrates a flow diagram for generating a System on Chip (SoC) from a floor plan having one or more integration descriptions.

FIG. 5A illustrates a flow diagram for generating a System on Chip (SoC) from a floor plan having one or more integration descriptions.

In an example implementation, the method 500 for generating a System on Chip (SoC) from a floor plan having one or more integration descriptions is provided. The method can include the steps of receiving inputs 502 and various constraints 504 from the user, generating one or more connections between the integration descriptions of the floor plan based at least on a traffic specification, and conducting a design check process 506 on the floor plan. If the design check process on the floor plan is indicative of passing the design check process, then the method generates 508 the SoC according to the one or more connections generated between the integration descriptions. If the design check process on the floor plan is indicative of not passing the design check process, then the method generates a report indicative of not passing.

Figure 5B:
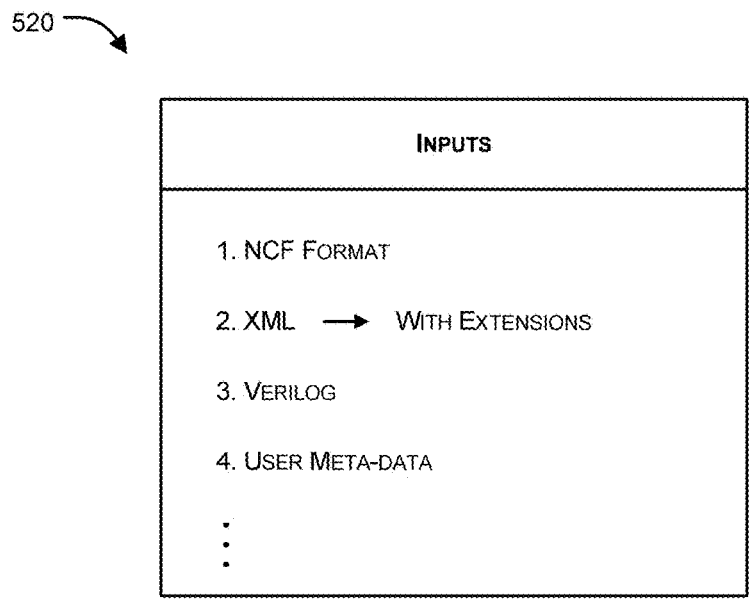

In an example implementation, the input 502 can be in the form of files such as but not limited to an XML file, a verilog file, an ISON file, a NCF file or a vendor meta-data as shown in FIG. 5B 520. The input files may include details associated with the requirements of the user for constructing a NoC and/or SoC. For example, the user can specify the number of ports and the capability of those ports to receive a specific protocol. In another example implementation, the input 502 can received and/or selected from form a database/repository pre-configured/pre-stored in the SoC platform.

In an example, a database contains a list of IPs such as CPU, memory controllers, cache, etc. and can be stored through the parallel files, devices, or any other generalized or customized format. The user can have a certain visibility of the stored IP which contains the information needed to build a NoC.

In an example implementation, the inputs to the system can be provided by way of XML file with extensions, verilog files, and so on, having details associated with the connection information from the one point to other. In example implementations, submitting the inputs and requirements itself can result in an indication or alert in real time about the mistakes in the design. For example, if a component receives multiple inputs despite having a single input port thereby rendering it logically incorrect, example implementations can, in real time, indicate the mistakes in the design which can be corrected by the user.

In an example implementation, if the design check process on the floor plan is indicative of not passing the design check process, then the method can provide the issues/errors/warnings/information about the not passing the design check process to the constraints and the inputs based on which the customization in real-time and/or offline can be made either by the user or the system itself to ensure obtaining of the optimized SoC construction.

Referring now to FIG. 5C illustrates an example set of customizable, configurable and re-configurable design rule checks (DRCs) 540 that are pre-fed to the system and checked while generating a System on Chip (SoC) from a floor plan having one or more integration descriptions.

In an example implementation, the DRCs are included in the system to generate at least an error, warning and/or information while generating a System on Chip (SoC) to confirm if the design may violate any fundamentals principles of design or any of proprietors own designs. In an example, the DRCs can include monitoring of various factors that includes, but are not limited to, sanity on ports (label width direction), clock compatibility, power compatibility, voltage compatibility, timing checks, pipelines, clock gravity, top level/internal port connections, and the like.

Referring now to FIG. 5D illustrates example outputs 560 that can be generated while generating a SoC from a floor plan. In an example implementation, while generating a SoC, the example implementations can also generate SoC connections, NoC IP, widths or RTL hierarchy, XML files, IP CACT files, collaterals/lists (such as but not limited to Synth (SDC), placements (DEF), or documentation report), design rules check report, register description (XML, CSV), system address mapping, verification checkers, BFMs and drivers simulations, as well as performance reports that may include, but is not limited to, area, bandwidth, latency, wiring and so on.

It may be appreciated that, the outputs generated according to the example implementations can be customized according to the requirements of the user.

Figure 6A:
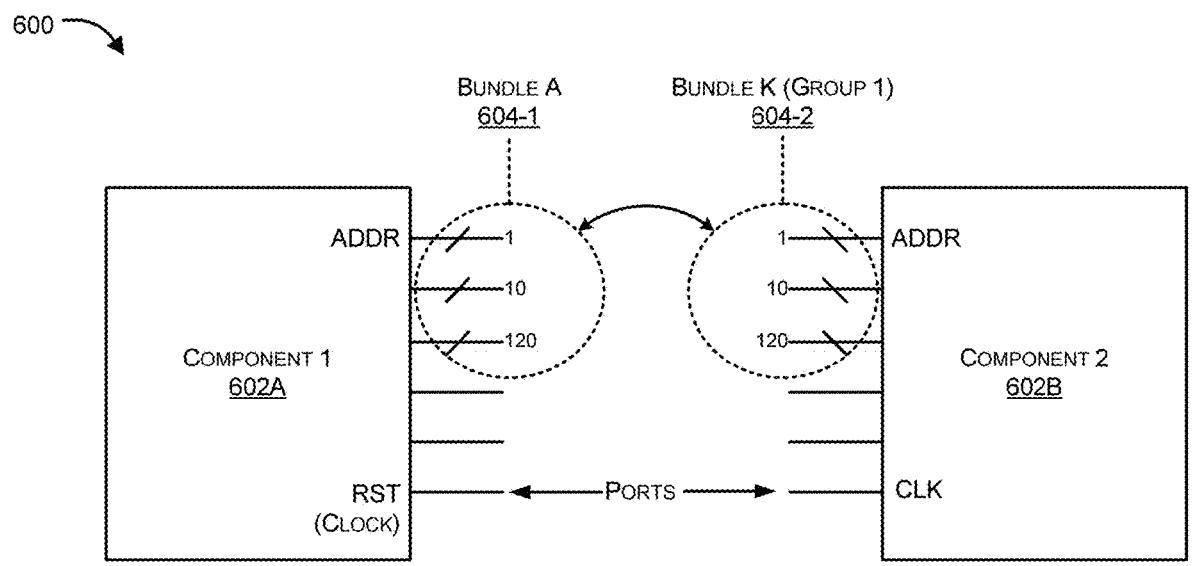
FIG. 6A illustrates a working of connection bundles.

FIG. 6A illustrates a working of connection bundles. As shown in FIG. 6A 600, Component 1 602A is in interaction with Component 2 602B using a plurality of links for example wires.

In an example implementation, a plurality of links of Component 1 602A which are adapted to connect with the a plurality of links of Component 2 602B can be bundled/grouped logically into one or more groups indicating that one group of Component 1 602A connects with one group of Component 2 602B. For example, as shown, Bundle A 604-1 of the Component 2 602B includes a plurality of wires that is confirmed to be connected to Bundle K 604-2 of the Component 2 602B.

Each component can include the ports and bundles. So first all the ports are grouped into a bundle and then the bundles are connected to each other. The bundles are sliceable. Further, since the bundle is represented logically, the bundle does not show up in a generated SoC design, but is only a specification to avoid the errors in connections. In the beginning every port is a bundle by itself.

In an example implementation, the signals can be labeled as well, and accordingly it is confirmed that the labels are matched which makes it very easy for the designers to match them. For example, the RST in Component 1 602A represents a clock signal port where as the CLK in Component 2 602B represents a clock signal port. Thus, even though the characteristics of a particular port may differ from one component to other, the functionality is identified during SoC generation and accordingly can facilitate connections between ports with similar characteristics. Labeling facilitates automation and a faster connection establishment which can also be visualized on the interface.

Figure 6B:
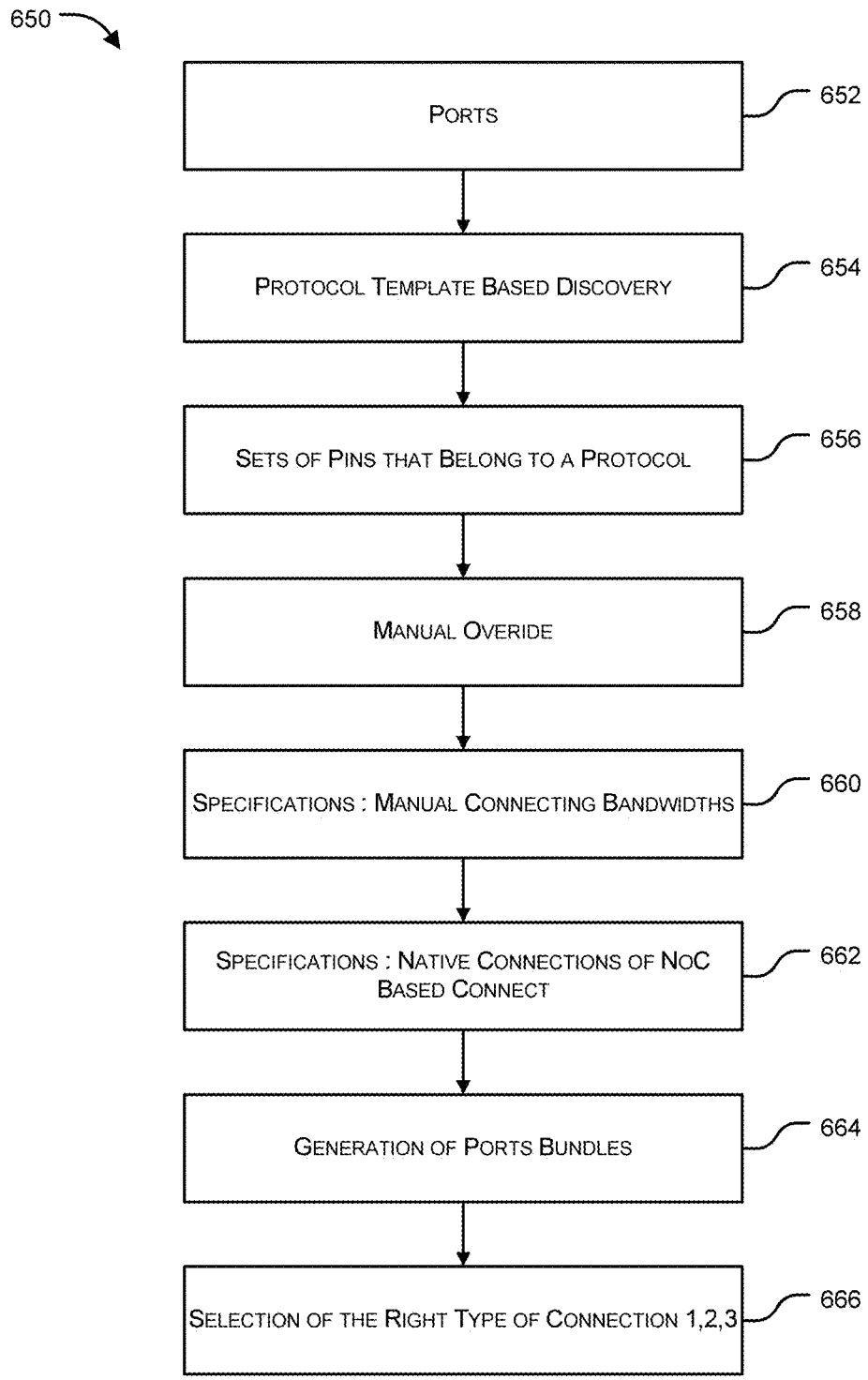
FIG. 6B illustrates connection bundles formation.

Referring now to FIG. 6B, a process 650 for connection bundles formation is illustrated. In an example implementation, the example implementations for forming connection bundles receives information associated with all the ports 652 in SoC design. Such ports may be associated with a single component of multiple components. At step 654, the system performs a protocol based template discovery to obtain one or more sets of pins associated with a particular protocol. At step 656, said sets of pins are identified. At step 658, a manual override is performed on said sets of pins based at least on a bandwidth constraint, or a native connection, or a NoC based connection, or any combination thereof. At step 660, a specification associated with the manual connecting bandwidths is applied. At step 662, specification associated with native connections of NoC based contents are applied. At step 664, a plurality of connection bundles are formed. At step 666, a right type of connections 1, 2, 3, etc. are selected for the plurality of connection bundles as defined in FIG. 7A.

Figure 7A:
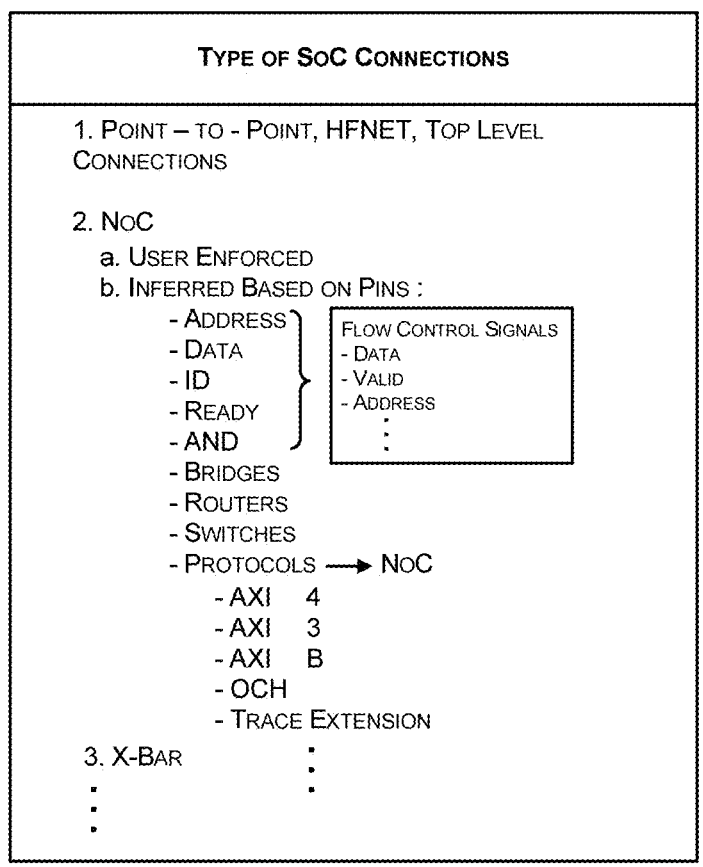
FIG. 7A illustrates various types of SoC connections.

FIG. 7A illustrates various types of SoC connections 700. As illustrated, there can be various types of connections formed while building a SoC. In an example, one type of connection can be a point-to point connection, High Fan-In/Fan-Out (HFNET) connection, top level connections. In another example, the connection can be of NoC level connections. For example, NoC level connections can be user enforced or inferred based on pins. In an example, another type of connection can be for connections associated with crossbar.

In an example, the connections which are established by inference based on pins can be of address type, valid type, data type, ready type, AND types, and so on which can be considered as flow control signals. In another example, the connections which are established by inference based on pins can be of connecting bridges, routers, switches, protocols of NoC like AX1 4, AX1 3, AX1 B, OCH, Trace extension etc.

Figure 7B:
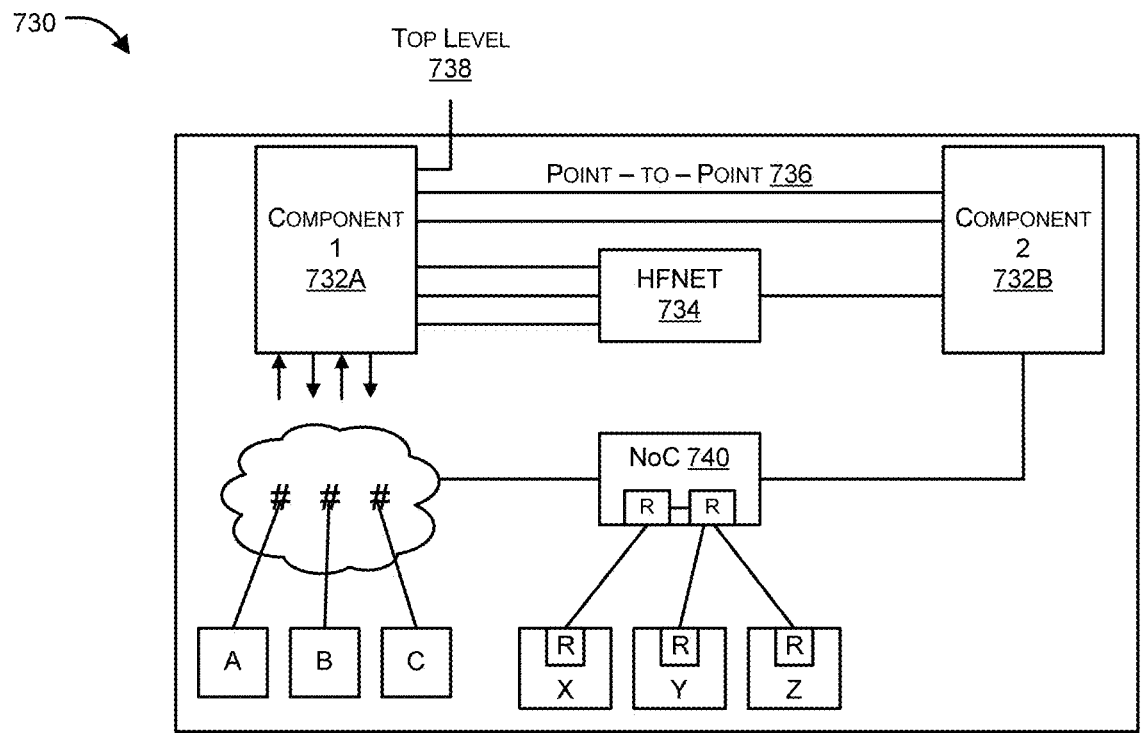
FIG. 7B illustrates example placement of various SoC connections.

FIG. 7B 730 illustrates example placement of various SoC connections upon establishing various connections as illustrated in FIG. 7A. As shown, a Component 1 732A can be interacting with Component 732B using various connections. In an example, connections established between the Component 1 732A and the Component 732B can be a point-to point connection 736 via wires and it can also be through HFNET 734. The Component 1 732A can have a connection as top level connection.

In an example, the Component 732B can be further connected to one or more other components "X", "Y", and "Z" via. NoC 740. The NoC can 740 can further be connected to a network "###" which can be further connected to other components "A", "B", and "C"

Figure 7C:
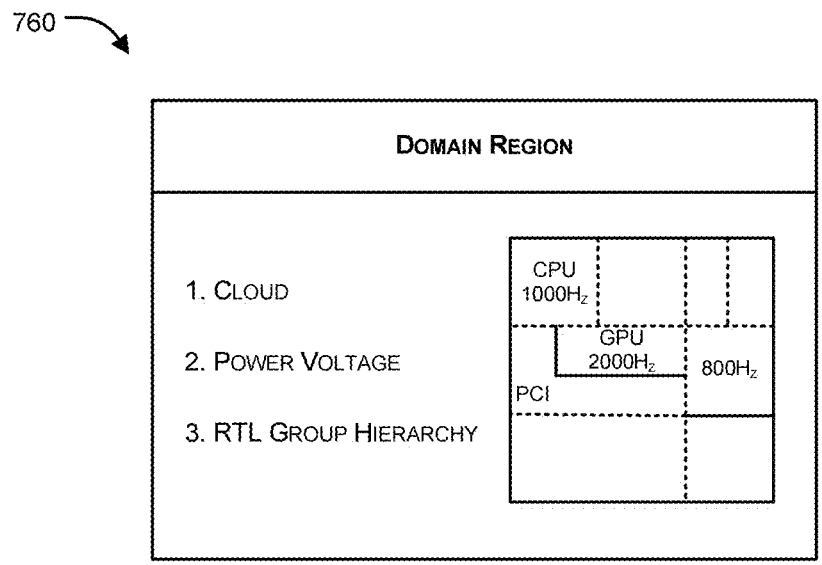
FIG. 7C illustrates various example usage of domain regions generated for a particular floor plan for generation of SoC.

FIG. 7C illustrates various example usage of domain regions 760 generated for a particular floor plan for generation of SoC. As shown, the SoC can be constructed based on various constrains/domains/regions. For example, the SoC can be constructed using clock domain/region, power or voltage domain, and RTL group hierarchy. In an example implementation, based on the various constrains/domains/regions the SoC can decide how much bandwidth/frequency needs to be allocated for various areas associated with the SoC design.

Figure 8:
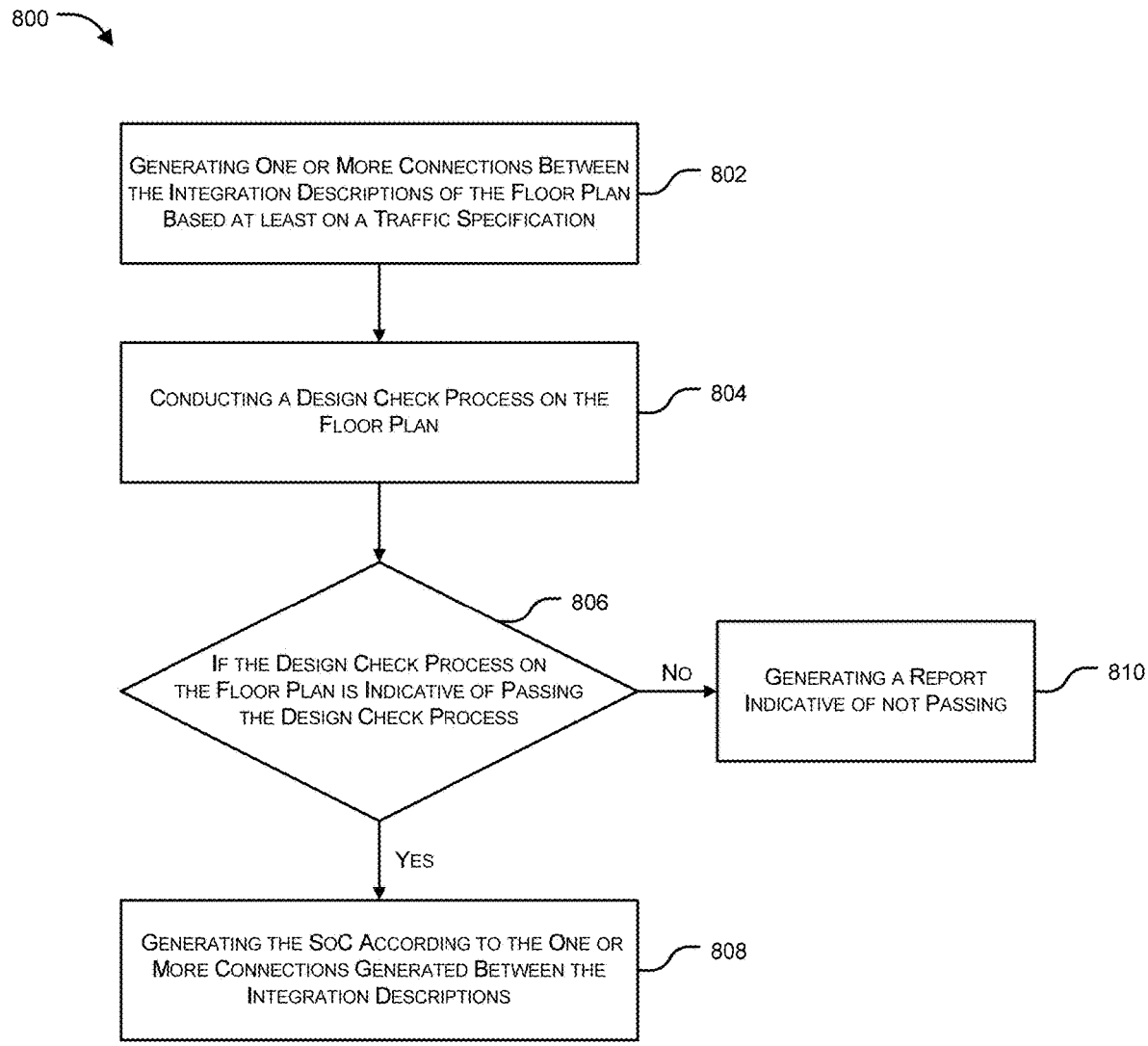
FIG. 8 illustrates an example flow diagram for generating a System on Chip (SoC) from a floor plan having one or more integration descriptions.

FIG. 8 illustrates an example flow diagram for generating a System on Chip (SoC) from a floor plan having one or more integration descriptions. A method 800 for generating a System on Chip (SoC) from a floor plan having one or more integration descriptions.

At step 802, one or more connections are generated between the integration descriptions of the floor plan based at least on a traffic specification. At step 804, a design check process on the floor plan is conducted. At step 806, if the design check process on the floor plan is indicative of passing the design check process (Yes), then at step 808, the method generates the SoC according to the one or more connections generated between the integration descriptions. At step 806, if the design check process on the floor plan is indicative of not passing the design check process (No), then at step 810 the method generates a report indicative of not passing.

In an aspect, the integration descriptions include information derived from the hardware IP to construct at least a NoC for integration into at least one SoC. In another aspect, the at least one integration description is selected from said one or more integration descriptions of the hardware IP based at least on an input received from one or more users.

In an aspect, the input is in a form of a file selected from any or combination of an XML file, a verilog file, a meta-data file or a file in a prescribed format.

In an aspect, the report includes any or combination of at least an error, a warning, and information associated with the design check process for not passing In an aspect, the method is implemented in a computing device or a cloud server.

In an aspect, the method can generate connections associated with any or combination of a NoC, an crossbar, and direct connections.

In an aspect, the method can generate one or more connection bundles. In another aspect, the one or more connection bundles are generated by determining information associated with one or more ports associated with the one or more connections, performing protocol based template discovery to obtain one or more sets of pins associated with a particular protocol, and performing manual override on said sets of pins based at least on a bandwidth constraint, or a native connection, or a NoC based connection, or any combination thereof.

In an aspect, the method can generate one or more groups associated with one or more connection bundles.

In an aspect, the method can connect said one or more connection bundles based on pre-determined criteria. In another aspect, at least one connection selected from said one or more connection bundles include a label.

In an aspect, the method can generate one or more domain regions for the floor plan. In another aspect, the method can generate the SoC using one or more domain regions generated for the floor plan.

In an aspect, the method can generate any or combination of SoC connections, NoC IP, RTL hierarchy, XML file/IP XACT file, one or more collaterals such as lists, design rules check report, register descriptions, system address mapping, verification checkers, drivers for simulations, and performance reports.

In an aspect, the design check process can include a pre-defined set of checklist or rules associated with any or combination of a sanity of ports, clock compatibility, power compatibility, voltage compatibility, timing checks, internal port connections checks, a traffic check, a bandwidth check, and a protocol check.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

In an aspect, the method can display dependencies of the at least one integration description selected on the other integration descriptions selected from said one or more integration descriptions.

Figure 9:
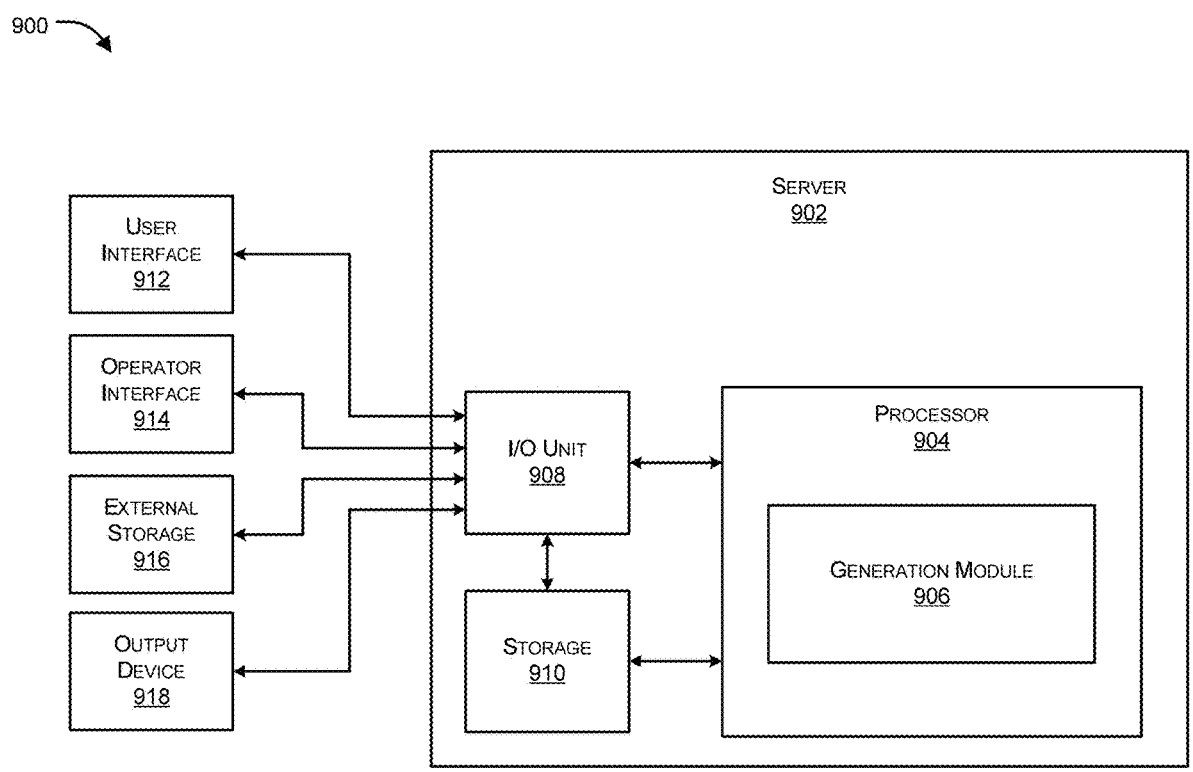
FIG. 9 illustrates an example computer system on which example embodiments may be implemented.

FIG. 9 illustrates an example computer system on which example embodiments may be implemented. This example system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, computer system 900 includes a server 902 that may involve an I/O unit 912, storage 910, and a processor 904 operable to execute one or more units as known to one skilled in the art. The term "computer-readable medium" as used herein refers to any medium that participates in providing instructions to processor 904 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 912 and operator interfaces 918 which may utilize input devices such as a keyboard, mouse, touch device, or verbal command The server 902 may also be connected to an external storage 916, which can contain removable storage such as a portable hard drive, optical media (CD or DVD), disk media or any other medium from which a computer can read executable code. The server may also be connected an output device 918, such as a display to output data and other information to a user, as well as request additional information from a user. The connections from the server 902 to the user interface 912, the operator interface 914, the external storage 916, and the output device 918 may via wireless protocols, such as the 802.11 standards, Bluetooth® or cellular protocols, or via physical transmission media, such as cables or fiber optics. The output device 918 may therefore further act as an input device for interacting with a user.

The processor 904 may execute one or more modules including includes a generation module 906 to generate one or more connections between the integration descriptions of the floor plan based at least on a traffic specification, and to conduct a design check process on the floor plan. If the design check process on the floor plan is indicative of passing the design check process, then the method generates the SoC according to the one or more connections generated between the integration descriptions. If the design check process on the floor plan is indicative of not passing the design check process, then the method generates a report indicative of not passing.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for generating a System on Chip (SoC) from a floor plan having one or more integration descriptions, said method comprising:
generating one or more connections between the integration descriptions of the floor plan based at least on a traffic specification;
conducting a design check process on the floor plan, wherein:
if the design check process on the floor plan is indicative of passing the design check process, generating the SoC according to the one or more connections generated between the integration descriptions, and
if the design check process on the floor plan is indicative of not passing the design check process, generating a report indicative of not passing; and generating one or more connection bundles based at least in part on determining information associated with one or more ports associated with the one or more connections;

wherein generation of the one or more connection bundles is based at least in part on the determination of the information associated with the one or more ports associated with the one or more connections and performance of protocol based template discovery to obtain one or more sets of pins associated with a particular protocol, as well as performance of a manual override on said sets of pins based at least in part on a bandwidth constraint, or a native connection, or a Network on Chip (NoC) based connection, or any combination thereof.

2. The method of claim 1, the integration descriptions comprising: information derived from a hardware Intellectual Property (IP) to construct at least a Network on Chip (NoC) for integration into at least one SoC.

3. The method of claim 1, wherein said at least one integration description is selected from said integration descriptions of the hardware Intellectual Property (IP) based at least on an input received from one or more users.

4. The method of claim 3, wherein said input is in a form of a file selected from at least one of an extended markup language (XML) file, an IP XACT file, a verilog file, a meta-data file or a file in a prescribed format.

5. The method of claim 1, wherein said report comprises at least one of an error, a warning, and information associated with the design check process for not passing.

6. The method of claim 1, wherein said method is implemented in a computing device or a cloud server.

7. The method of claim 1, further comprising: generating connections associated with at least one of an NoC, a crossbar, and direct connections.

8. The method of claim 1, further comprising generating one or more groups associated with the one or more connection bundles.

9. The method of claim 1, further comprising connecting said one or more connection bundles based on pre-determined criteria.

10. The method of claim 1, wherein at least one connection bundle selected from said one or more connection bundles comprises a label.

11. The method of claim 1, further comprising: generating one or more domain regions for the floor plan.

12. The method of claim 1, further comprising: generating the SoC using one or more domain regions generated for the floor plan.

13. The method of claim 1, further comprising: generating any or combination of SoC connections, NoC IP, RTL hierarchy, XML file/1P XACT file, one or more collaterals such as design rules check report, register descriptions, system address mapping, verification checkers, drivers for simulations, and performance reports.

14. The method of claim 1, wherein the design check process comprising a pre-defined set of checklist or rules associated with any or combination of sanity of ports, clock compatibility, power compatibility, voltage compatibility, timing checks, internal port connections checks, traffic check, bandwidth check, and protocol check.

15. The method of claim 1, wherein the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

16. The method of claim 1, further comprising: displaying dependencies of the at least one integration description selected on the other integration descriptions selected from said one or more integration descriptions.

17. One or more non-transitory computer-readable medium comprising one or more instructions that when executed on at least one processor configure the at least one processor to perform one or more operations to:

generate one or more connections between integration descriptions of a floor plan of a System on Chip (SoC) based at least on a traffic specification;

conduct a design check process on the floor plan, wherein:
if the design check process on the floor plan is indicative of passing the design check process, generate the SoC according to the one or more connections generated between the integration descriptions, and
if the design check process on the floor plan is indicative of not passing the design check process, generate a report indicative of not passing; and generate one or more connection bundles based at least in part on determining information associated with one or more ports associated with the one or more connections, wherein generation of the one or more connection bundles is based at least in part on the determination of the information associated with the one or more ports associated with the one or more connections and performance of protocol based template discovery to obtain one or more sets of pins associated with a particular protocol, as well as performance of a manual override on said sets of pins based at least in part on a bandwidth constraint, or a native connection, or a Network on Chip (NoC) based connection, or any combination thereof.

18. The one or more non-transitory computer-readable medium of claim 17, wherein the integration descriptions includes: information derived from a hardware Intellectual Property (IP) to construct at least a Network on Chip (NoC) for integration into at least one SoC.

19. The one or more non-transitory computer-readable medium of claim 17, further comprising one or more instructions that when executed on the at least one processor configure the at least one processor to perform one or more operations to cause selection of the at least one integration description from said integration descriptions of the hardware Intellectual Property (IP) based at least on an input received from one or more users.

20. The one or more non-transitory computer-readable medium of claim 17, further comprising one or more instructions that when executed on the at least one processor configure the at least one processor to perform one or more operations to cause provision of said input is in a form of a file selected from at least one of an extended markup language (XML) file, an IP XACT file, a verilog file, a meta-data file or a file in a prescribed format.

* * * * *